(12) United States Patent
Dong et al.

(10) Patent No.: US 12,515,815 B2
(45) Date of Patent: Jan. 6, 2026

(54) CHANNEL CRAWLER AND METHOD OF USE

(71) Applicants: The Boeing Company, Arlington, VA (US); University of Washington, Seattle, WA (US)

(72) Inventors: Shuonan Dong, Seattle, WA (US); Silas Studley, Redmond, WA (US); Keegan Bray, Federal Way, WA (US); Jonathan Ahn, Seattle, WA (US); Wade Marquette, Seattle, WA (US); Kyle Schultz, Seattle, WA (US); Naga Vamsi Krishna Jonnalagadda, Seattle, WA (US); Benjamin Wong, Seattle, WA (US); Joseph Garbini, Seattle, WA (US); Santosh Devasia, Seattle, WA (US)

(73) Assignee: The Boeing Company, Arlington, VA (US)

(*) Notice: Subject to any disclaimer, the term of this patent is extended or adjusted under 35 U.S.C. 154(b) by 179 days.

(21) Appl. No.: 18/434,045

(22) Filed: Feb. 6, 2024

(65) Prior Publication Data
US 2025/0250030 A1 Aug. 7, 2025

(51) Int. Cl.
*B64F 5/60* (2017.01)
*B25J 5/02* (2006.01)

(52) U.S. Cl.
CPC .. *B64F 5/60* (2017.01); *B25J 5/02* (2013.01)

(58) Field of Classification Search
CPC .................................... B64F 5/60; B25J 5/02
See application file for complete search history.

(56) References Cited

U.S. PATENT DOCUMENTS

| | | | |
|---|---|---|---|
| 9,404,898 B1 | 8/2016 | Georgeson | |
| 10,603,802 B2 | 3/2020 | Akin et al. | |
| 11,077,558 B2 | 8/2021 | Ohm et al. | |
| 2012/0256643 A1 | 10/2012 | Langley | |
| 2013/0289766 A1* | 10/2013 | Hafenrichter | ........ G01N 29/043 901/1 |
| 2019/0300205 A1* | 10/2019 | Georgeson | ............. G01N 25/20 |
| 2022/0281102 A1 | 9/2022 | Chungbin | |

OTHER PUBLICATIONS

EPO, Extended European Search Report for EP application No. 25155157.8, issued on May 9, 2025.

* cited by examiner

*Primary Examiner* — Zoheb S Imtiaz

(57) ABSTRACT

A channel crawler has a carriage, a stabilizing mechanism, and a deployment mechanism. The carriage has wheels configured to engage surfaces that define a channel through which the carriage is configured to move. The stabilizing mechanism is configured to extend from the carriage and engage a non-horizontal surface of the channel in a manner restricting unintended movement of the carriage in one or more directions. The deployment mechanism is configured to fit within the carriage when retracted, and selectively deploy an operational device from a stowed position within the carriage to a deployed position outside the channel for performing an operation in relation to at least one of structure and hardware proximate the channel.

20 Claims, 19 Drawing Sheets

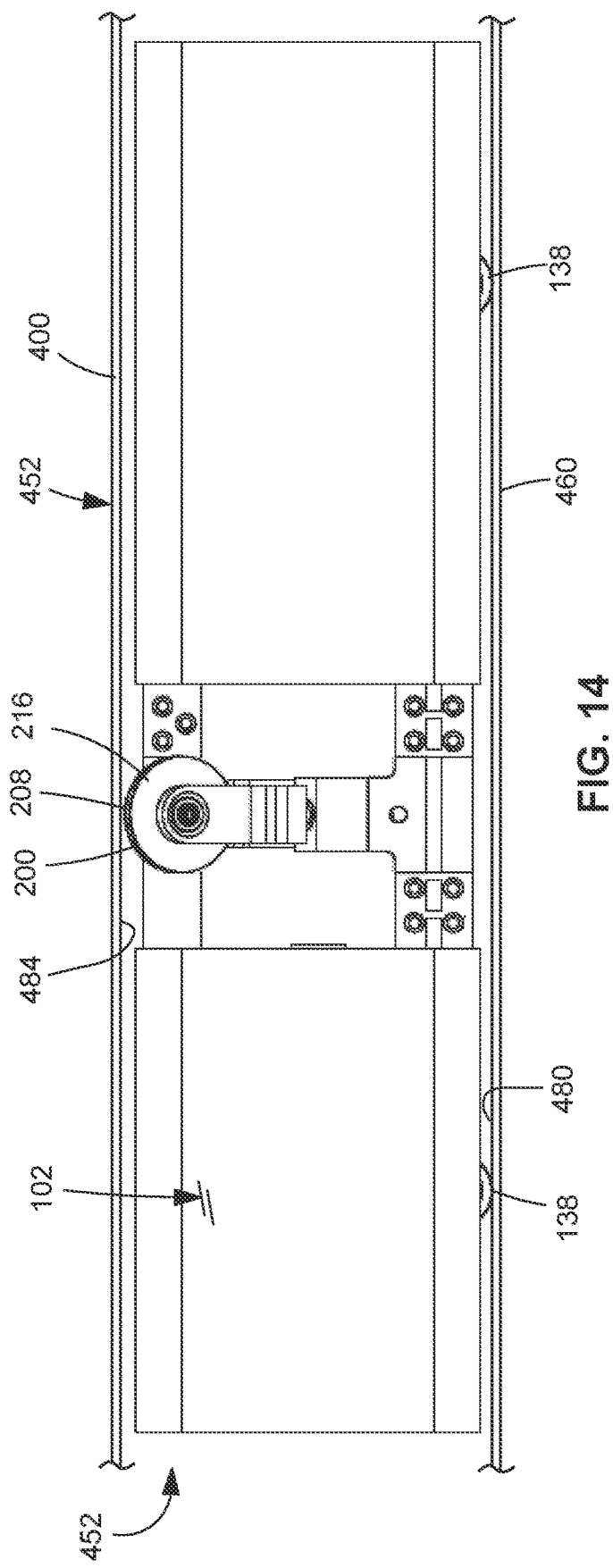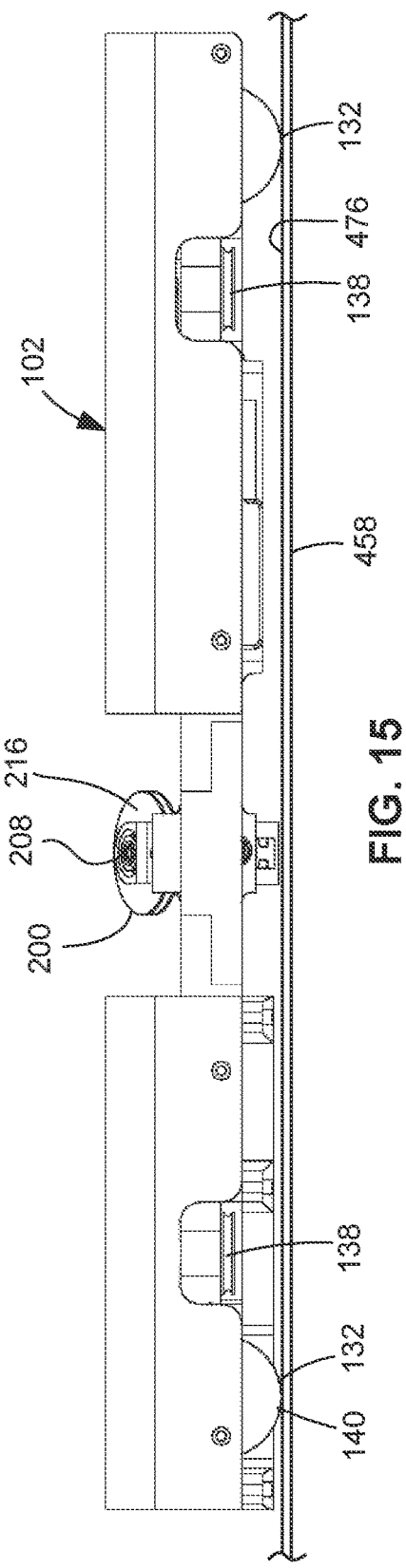
FIG. 14
FIG. 15

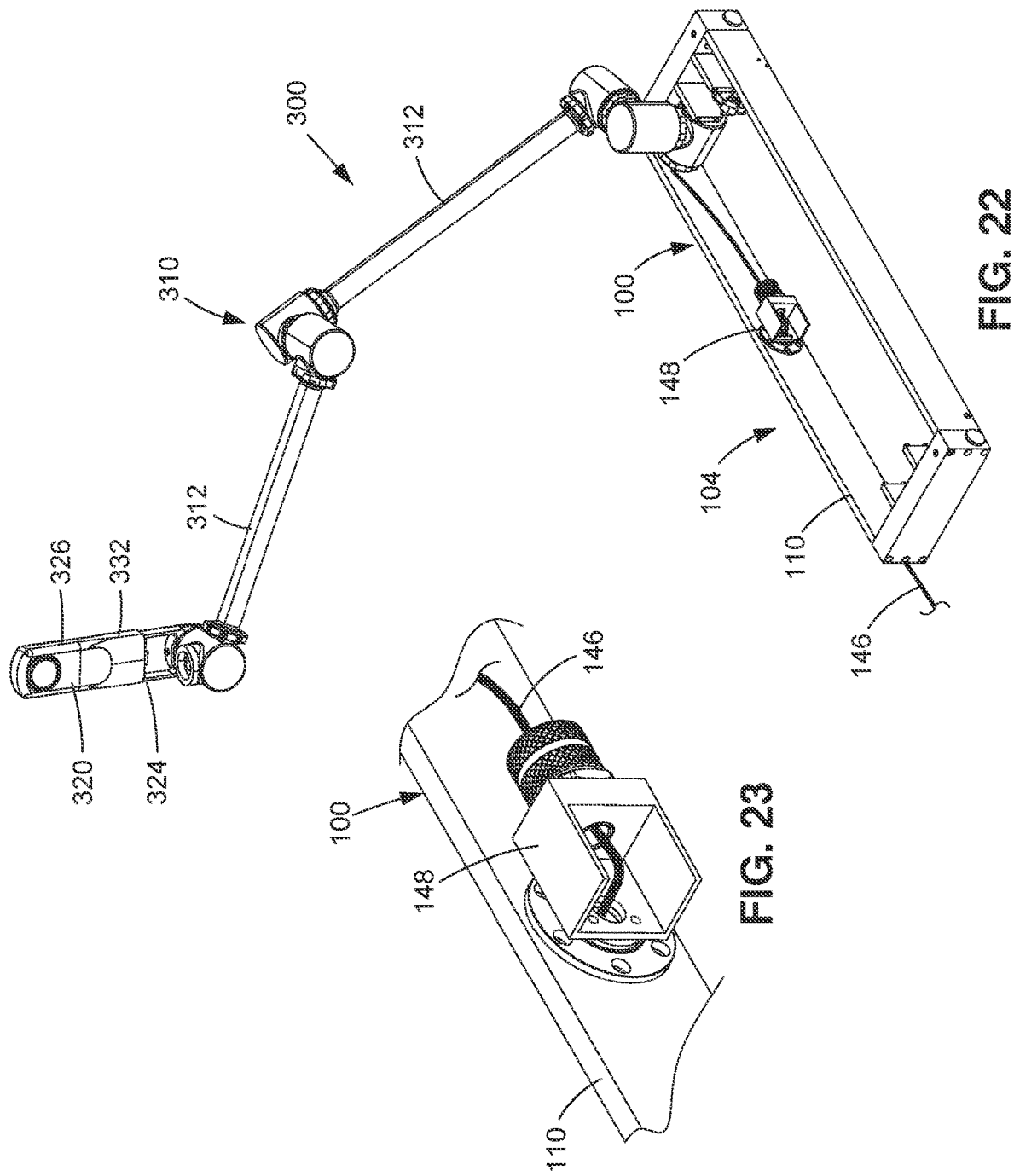

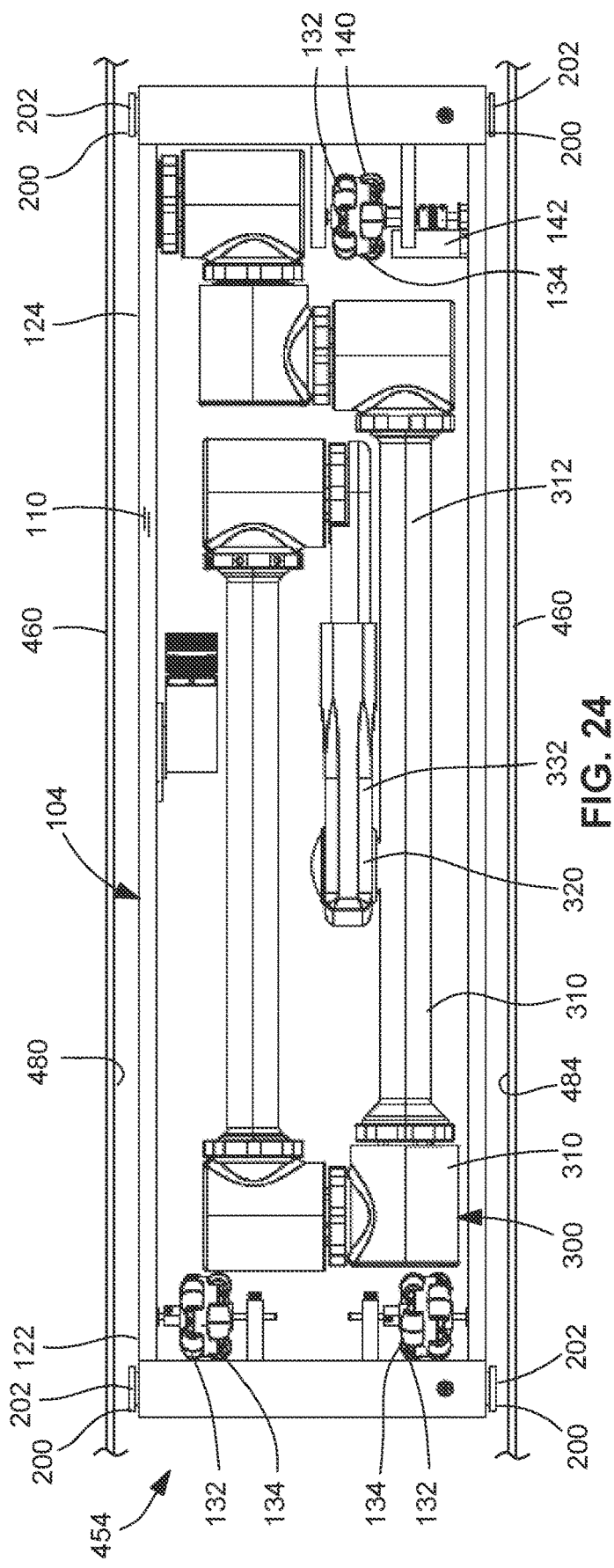
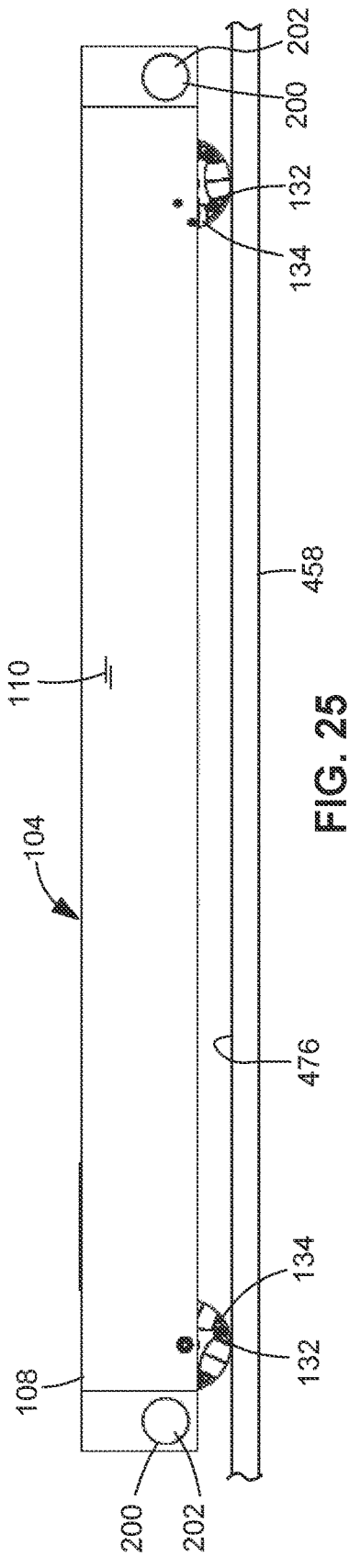
FIG. 24
FIG. 25

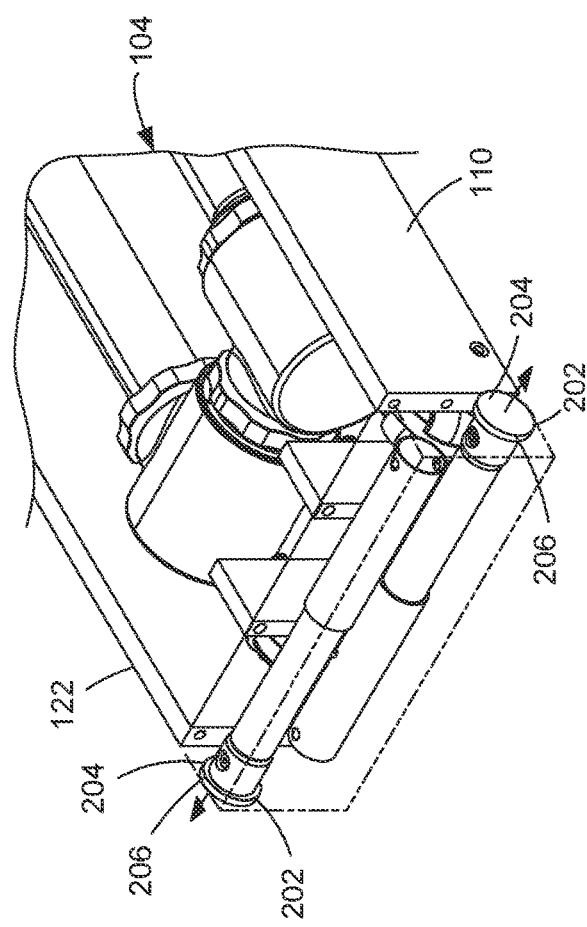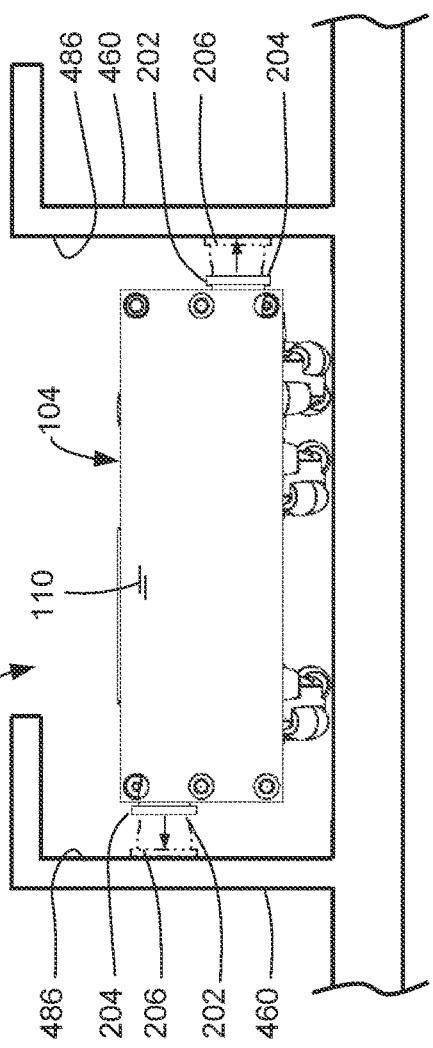

CHANNEL CRAWLER AND METHOD OF USE

FIELD

The present disclosure relates generally to mechanisms and methods for performing operations in confined spaces, such as inspecting an interior of an aircraft wing.

BACKGROUND

The manufacturing of an aircraft includes inspecting the aircraft structure and various systems at different stages of production. Inspections are also performed during post-production maintenance of the aircraft. Some inspection operations require accessing confined spaces to perform a visual inspection of the aircraft structure and the systems contained within the structure. For example, inspection of a fuel tank in an aircraft wing typically requires accessing the interior of the wing tank to perform a visual inspection of fasteners, sealant, and hardware (e.g., tubing, wiring, etc.) within the wing tank.

One method for visually inspecting an aircraft wing tank involves a human operator such as an inspection mechanic entering the wing tank through an access hole typically formed in a lower skin panel of the aircraft wing. Once inside, the inspection mechanic crawls around the inside of the wing tank looking for potential non-conformances. For wing tanks that span multiple rib bays, it is typically necessary for the inspection mechanic to crawl through relatively small holes in the wing ribs to gain access to adjacent rib bays. In certain aircraft, there are rib bays that do not have access holes directly to the outside. In order to access those rib bays, mechanics must enter an adjacent rib bay through an access hole in the lower skin panel, then crawl through a small hole in the wing rib.

As may be appreciated, the manual inspection of an aircraft wing tank can present ergonomic challenges and issues. For aircraft that have relatively small wings, space and size constraints may prevent an inspection mechanic from accessing the interior of the wing tank. In addition to ergonomic challenges, the manual inspection of aircraft wing tanks can be a time consuming process which can impact the production rate of an aircraft manufacturing program or increase the downtime of an in-service aircraft during its annual inspection.

As can be seen, there exists a need in the art for a mechanism and method for accessing a confined space of a structure and performing one or more operations within the confined space such as inspecting an aircraft wing tank, and which may supplement an inspection performed by a human operator, and/or reduce or obviate the need for a human operator to physically crawl into the confined space to perform the inspection or other operations. The mechanism and method is preferably capable of passing between multiple compartments that make up the confined space, such as the multiple rib bays of a wing tank.

SUMMARY

The above-noted needs associated with mechanisms and methods for accessing a confined space of a structure are addressed by the present disclosure, which provides a channel crawler that has a carriage, a stabilizing mechanism, and a deployment mechanism. The carriage has wheels configured to engage surfaces that define a channel through which the carriage is configured to move. The stabilizing mechanism is configured to extend from the carriage and engage a non-horizontal surface of the channel in a manner restricting unintended movement of the carriage in one or more directions. The deployment mechanism is configured to fit within the carriage when retracted, and selectively deploy an operational device from a stowed position within the carriage to a deployed position outside the channel for performing an operation in relation to at least one of structure and hardware proximate the channel.

Also disclosed is an inspection system having an upper channel crawler and a lower channel crawler. The upper channel crawler has an upper channel carriage and a crane mechanism. The upper channel carriage has a carriage lower side and wheels configured to engage opposing side surfaces of an upper channel through which the upper channel carriage is configured to move. The crane mechanism is configured to lower an upper camera from the carriage lower side into a space between the upper channel and a lower channel. The lower channel crawler has a lower channel carriage and a robotic arm. The lower channel carriage has a carriage upper side and wheels configured to engage a lower surface of the lower channel through which the lower channel carriage is configured to move. The robotic arm is configured to raise a lower camera up from the carriage upper side of the lower channel carriage for inspecting portions of the space that are outside the field of view of the upper camera.

Also disclosed is a method comprising the step of moving a carriage through a channel via wheels engaging surfaces that define the channel. The method also includes the step of extending a stabilizing mechanism from the carriage and into engagement with a non-horizontal surface of the channel in a manner restricting unintended movement of the carriage in one or more directions. In addition, the method includes the step of deploying an operational device from a stowed position within the carriage to a deployed position outside the channel using a deployment mechanism configured to fit within the carriage when retracted. Furthermore, the method includes the step of performing an operation in relation to at least one of structure and hardware proximate the channel using the operational device in the deployed position.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 14 is a top view of the upper channel crawler showing the engagement of its horizontal wheels to the channel first side surface of the stringer channel, and the engagement of the diagonally-mounted wheel with the channel second side surface;

FIG. 15 is a side view of the upper channel crawler showing the engagement of its vertical wheels with the channel lower surface of the stringer channel;

FIG. 22 is a top-down perspective view of the lower channel crawler showing the robotic arm extended and supporting the camera in a deployed position;

FIG. 23 is a magnified view of a portion of the lower channel crawler of FIG. 22 showing a right-angle connector for hardwire connection of the lower channel crawler to a device (e.g., a laptop) enabling manual control from a location outside of the wing box;

FIG. 24 is a top view of the lower channel crawler;

FIG. 25 is a side view of the lower channel crawler showing the engagement of its vertical wheels with the channel lower surface of the stringer channel;

FIG. 26 is an end view of the lower channel crawler showing a pair of extendible stopper arms engaging non-horizontal surfaces of the stringer channel in a manner preventing movement of the lower channel crawler relative to the stringer channel;

FIG. 27 is a perspective view of one end of the lower channel crawler showing an example in which the stopper arms are axially extended in opposing directions for engagement with the stringer channel;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version." Instances of the phrases "one version" or "a version" do not necessarily refer to the same version. Similarly, this specification includes references to "one example" or "an example." Instances of the phrases "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 2:
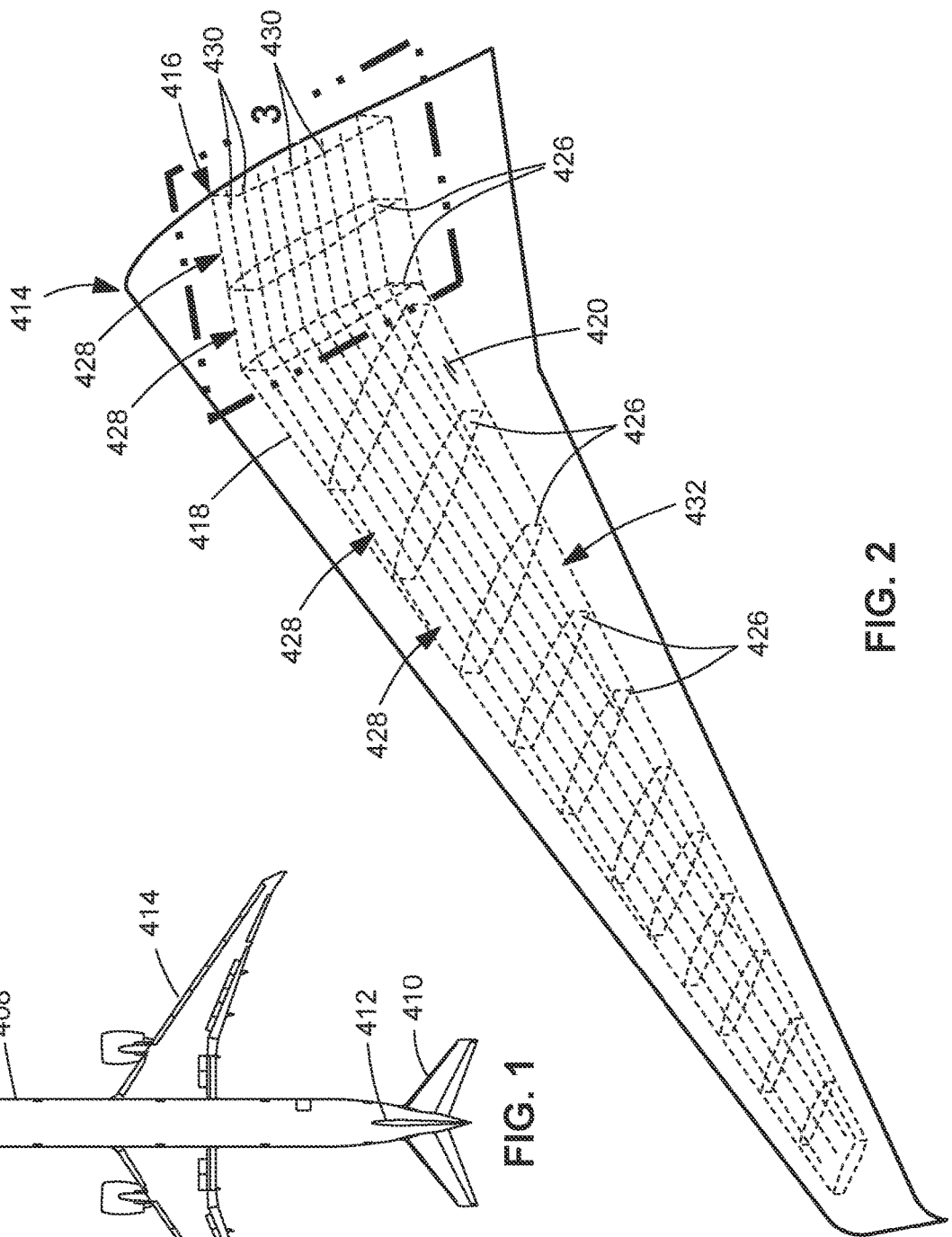
FIG. 2 is a perspective view of an example of a wing of the aircraft of FIG. 1.
Figure 1:
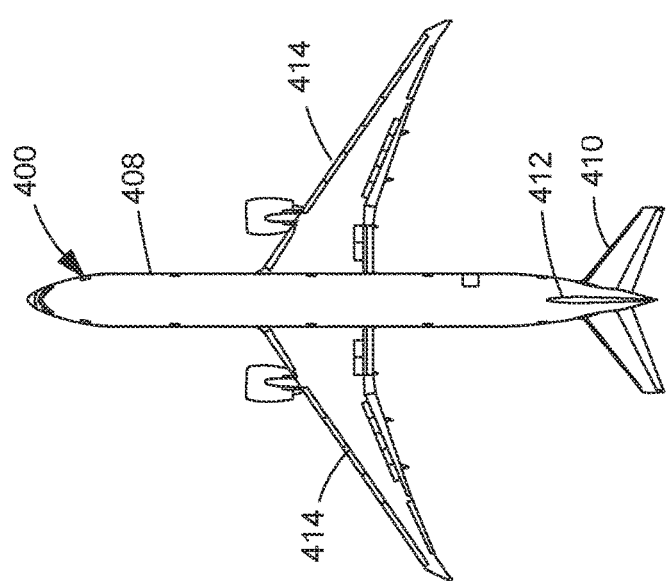
FIG. 1 shows an example of an aircraft.
Figure 3:
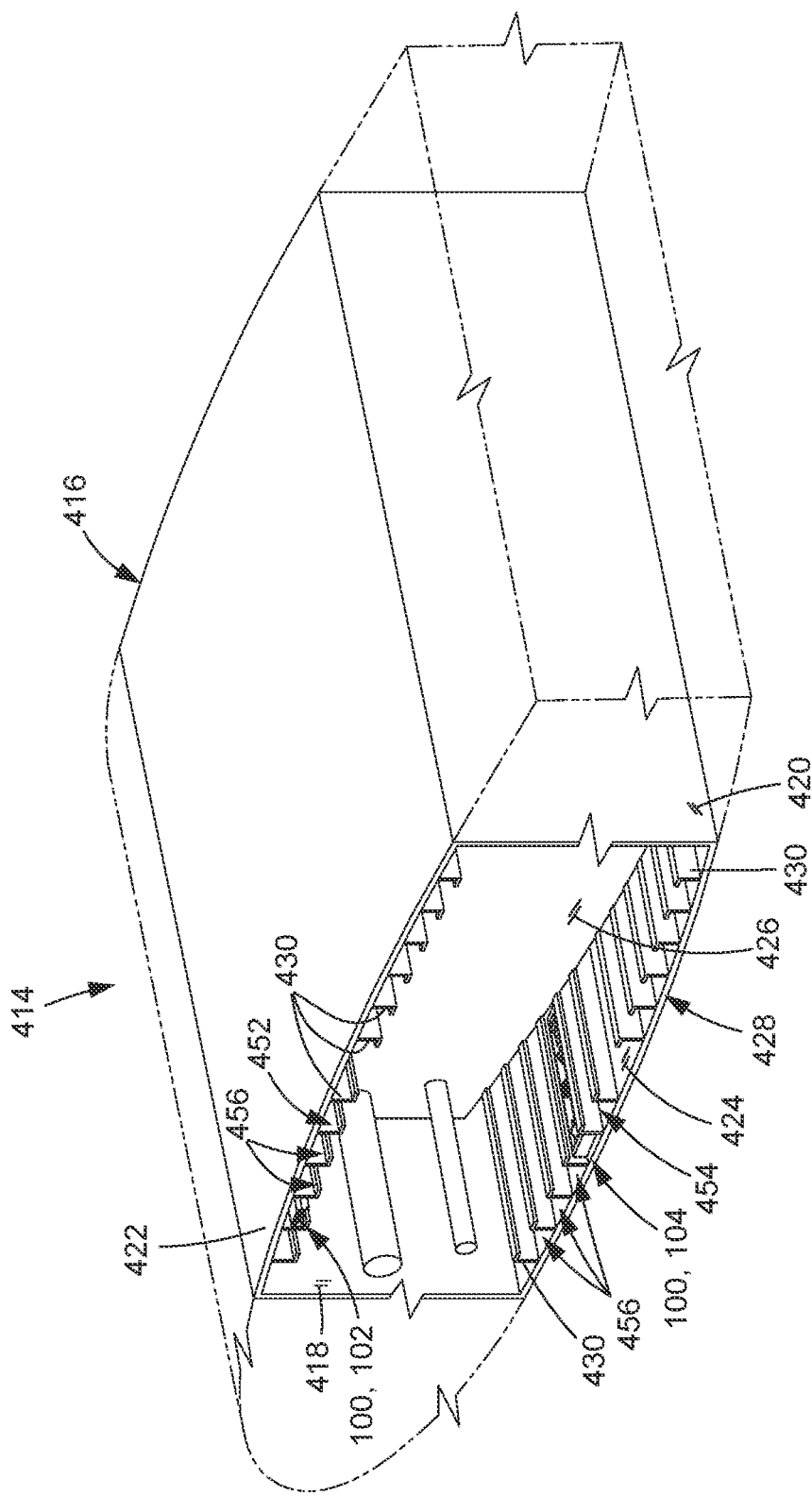
FIG. 3 is a magnified view of a portion of a wing box of the wing of FIG. 2 and illustrating a plurality of stringers extending from upper and lower skin panels and defining stringer channels within an interior of the wing box.
Figure 4:
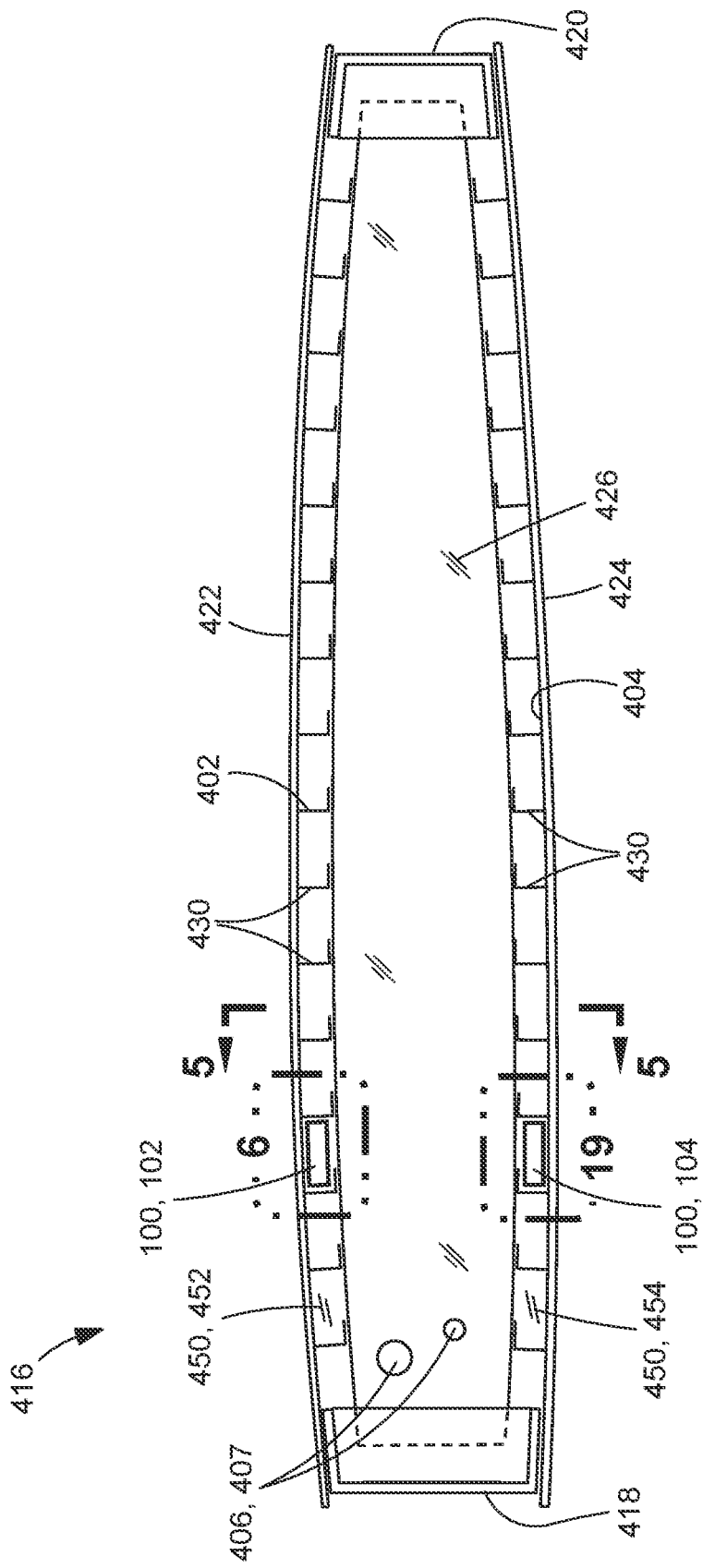
FIG. 4 is an end view of the wing box of FIG. 3 showing an upper channel crawler disposed in a stringer channel on an upper side of the wing box, and a lower channel crawler disposed in a stringer channel on a lower side of the wing box.

Referring now to the drawings which illustrate various examples of the disclosure, shown in FIG. 1 is an example of an aircraft 400 having a fuselage 408, a horizontal tail 410 (e.g., a stabilizer and elevator), a vertical tail 412, and a pair of wings 414. FIG. 2 shows one of the wings 414 which has a wing box 416. As shown in FIGS. 2-4, the wing box 416 is defined by upper and lower skin panels 422, 424, forward and aft spars 418, 420, and multiple wing ribs 426 that are spaced apart from each other. The wing ribs 426 divide the interior of the wing box 416 into multiple compartments referred to as rib bays 428. The upper and lower skin panels 422, 424 are stiffened by stringers 430 that extend along a spanwise direction of the wing 414. In the example shown, the interior of the wing box 416 functions as an integral fuel tank (i.e., a wing tank 432) which typically spans two or more rib bays 428. As mentioned above, visual inspection of the interior of a wing tank 432 is performed during production of an aircraft 400 and/or during post-production as part of regularly-scheduled inspection and maintenance. The inspection of the wing tank 432 is performed as a means to verify the integrity of fasteners, sealant, systems (e.g., tubing, wires, etc.), and/or other components or structure within the wing tank 432.

Figure 5:
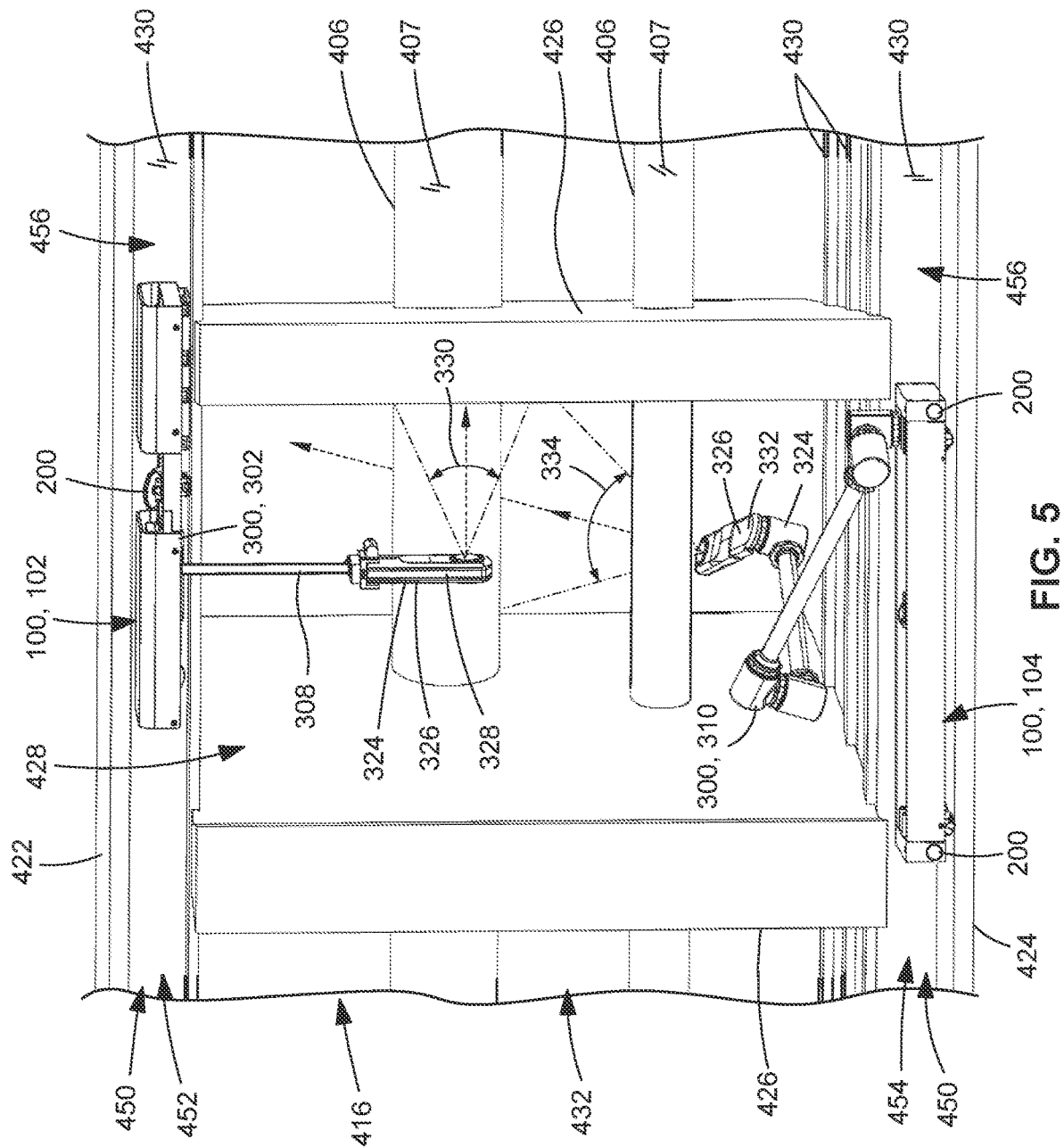
FIG. 5 is a sectional view of the interior of the wing box taken along line 5-5 of FIG. 4 and illustrating a camera suspended from the upper channel crawler, and further illustrating a camera supported on a robotic arm extended from the lower channel crawler.

Toward this end, FIGS. 3-5 illustrate examples of the presently-disclosed channel crawler 100 disposed in stringer channels 456 defined by stringers 430 that protrude into the wing box 416 from the upper skin panel 422 and the lower skin panel 424. When viewed from a top-down perspective, the stringers 430 are generally parallel to each other along the lengthwise direction of the stringers 430. An upper channel crawler 102 is shown disposed in an upper channel 452 (e.g., a stringer channel 456) on an upper side of the wing box 416, and a lower channel crawler 104 is disposed in a lower channel 454 (e.g., a stringer channel 456) on a lower side of the wing box 416.

As described below, each channel crawler 100 has a deployment mechanism 300 configured to deploy a camera 326 that enables preprogrammed, tele-operated, and/or remotely controlled inspection of a confined space such as the wing tank 432, and thereby may supplement inspection performed by a human operator, and/or reduce or obviate the need for an inspection mechanic to physically crawl into the wing tank 432 to visually inspect the interior. As shown in FIG. 5 and described in greater detail below, the stringer channels 456 are continuous and unobstructed along their lengths, allowing the channel crawlers 100 to freely pass between multiple rib bays 428 that make up the wing tank 432. In this regard, the presently disclosed channel crawlers 100 are configured to have a cross-sectional shape and/or size that is complementary to the cross-sectional shape and/or size of a channel 450, allowing the channel crawler 100 to fit within the channels 450 and move generally in an unrestricted manner along the length of the channels 450 across multiple compartmentalized areas (e.g., rib bays 428) of a confined space such as a wing tank 432.

Although described in the context of an aircraft 400 (FIG. 1), the presently disclosed channel crawlers 100 are not limited to configurations designed to move through stringer channels 456 (FIG. 4) of a wing box 416 (FIG. 4), but can be configured to move through stringer channels 456 of any one of a variety of different types of aircraft structures including, but not limited to, the fuselage 408 (FIG. 1), the horizontal tail 410 (e.g., a stabilizer and/or elevator), the vertical tail 412 (e.g., a fin and/or rudder), or any one of a variety of other types of aircraft structures. Further in this regard, the presently disclosed channel crawlers 100 are not limited to moving through stringer channels 456, but can be configured to move through any type of channel 450 having a top surface and/or a bottom surface and a spaced-apart pair of side surfaces (e.g., non-horizontal surfaces 486).

Even further, the channel crawlers 100 are not limited to performing inspections of confined spaces, but can be configured to perform any one of a variety of different types of operations including, but not limited to, detecting and/or picking up foreign object debris (FOD) within a confined space, re-applying sealant, conducting tests to ensure the integrity of the structure 402 (FIG. 4) and/or hardware 404 (FIG. 4) within the confined space, and/or serving as a shop aid to visually assist mechanics in various in-tank operations. Although described in the context of a confined space such as a wing tank 432, the presently disclosed channel crawlers 100 can be used in any application or environment where there is a channel 450, and are not limited to use in confined spaces.

Figure 8:
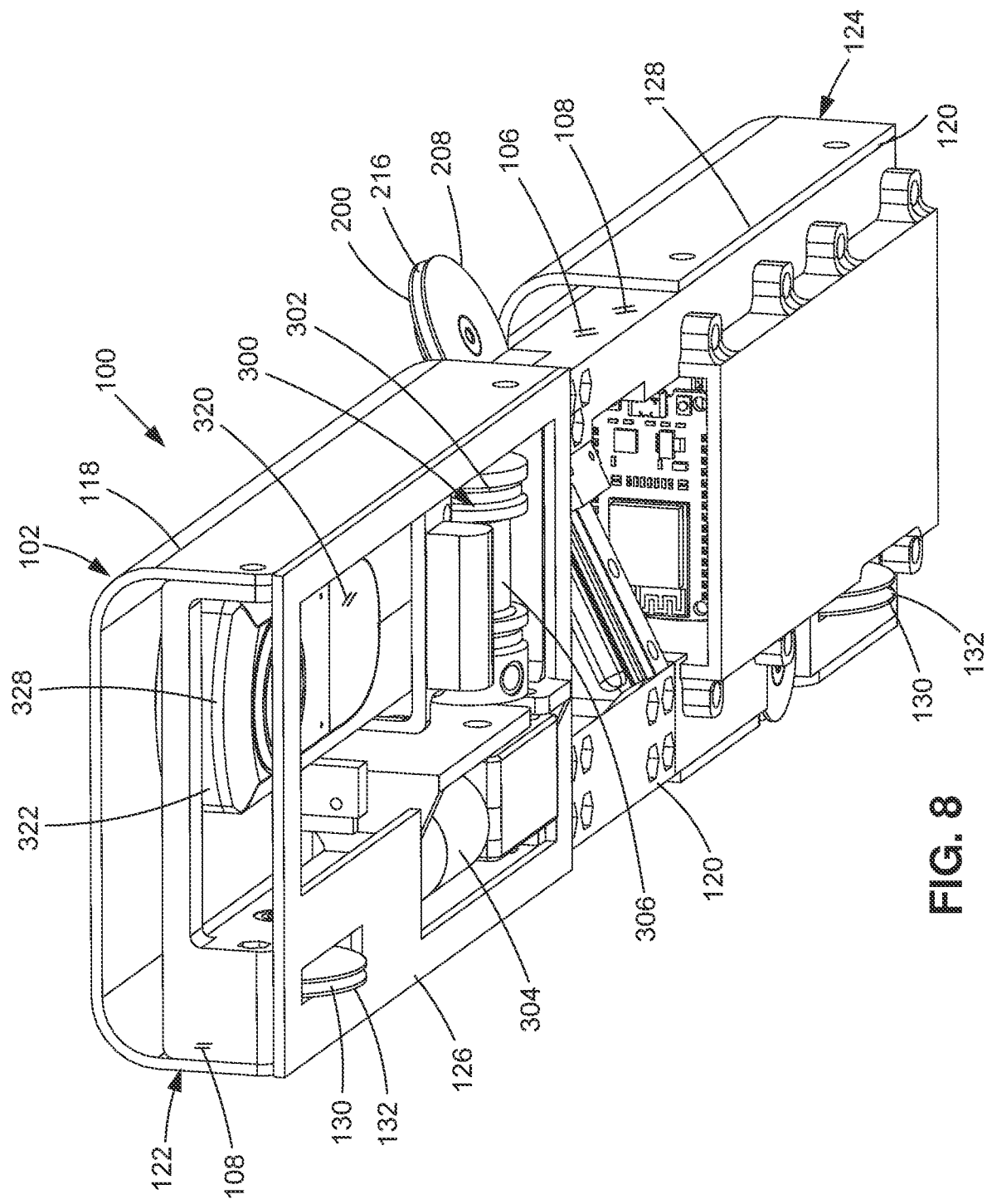
FIG. 8 is a bottom-up perspective view of the upper channel crawler.
Figure 21:
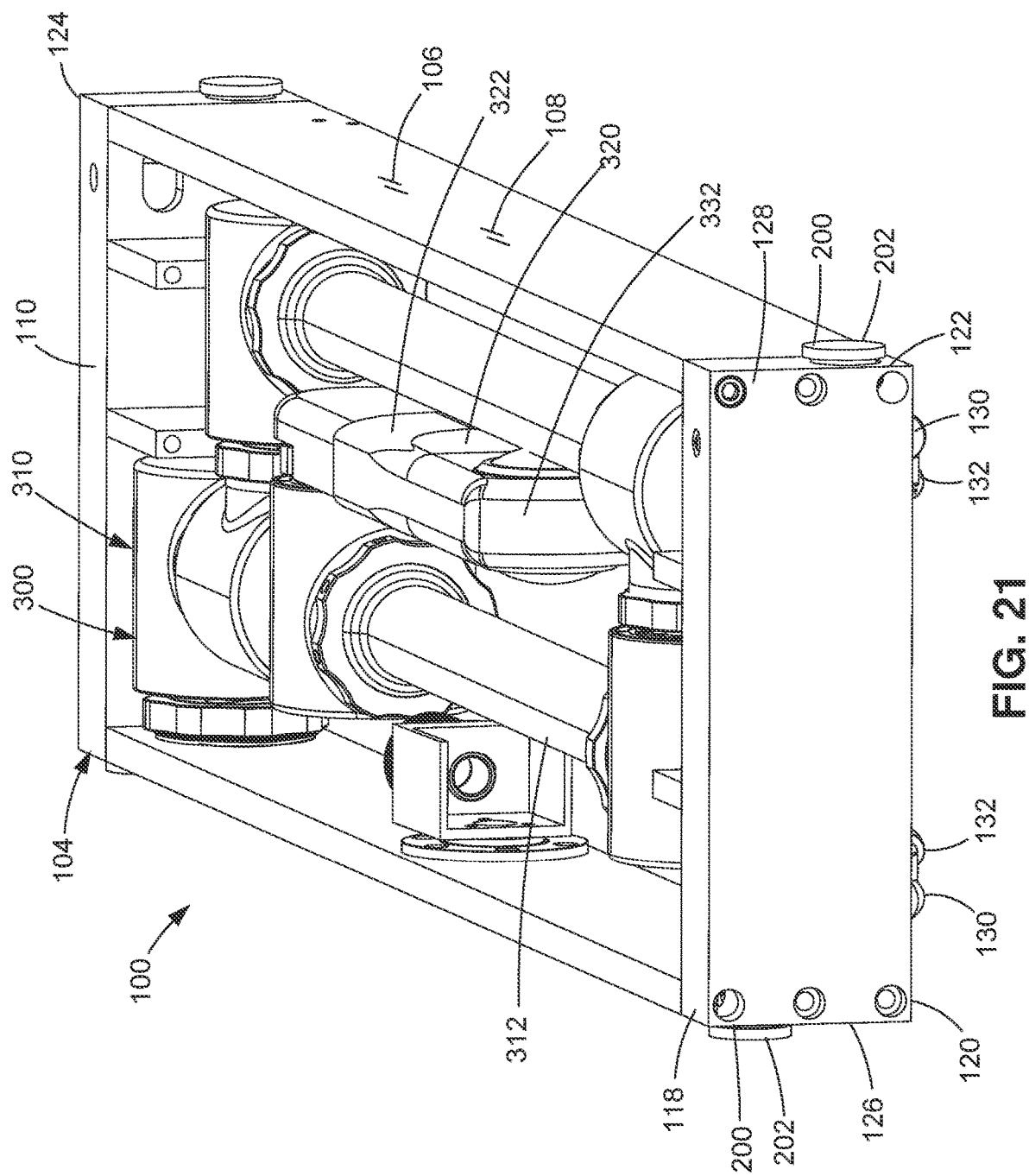
FIG. 21 is a top-down perspective view of the lower channel crawler.

As shown in FIGS. 8 and 21, the presently disclosed channel crawlers 100 each have a carriage 106, one or more stabilizing mechanisms 200, and a deployment mechanism 300. The carriage 106 has wheels 130 that are configured to engage the surfaces that define a channel 450 (e.g., a stringer channel 456) through which the carriage 106 is configured to move. Each stabilizing mechanism 200 is mounted to the carriage 106, and is configured to extend from the carriage 106 and engage a non-horizontal surface 486 (FIGS. 6 and 19) of a channel 450 in a manner restricting unintended movement of the carriage 106 in one or more directions. The deployment mechanism 300 is configured to fit within the carriage 106 when retracted, and selectively deploy an operational device 320 from a stowed position 322 within the carriage 106 to a deployed position 324 (FIG. 5) outside the channel 450 for performing an operation in relation to structure 402 and/or hardware 404 located proximate the channel 450.

Figure 6:
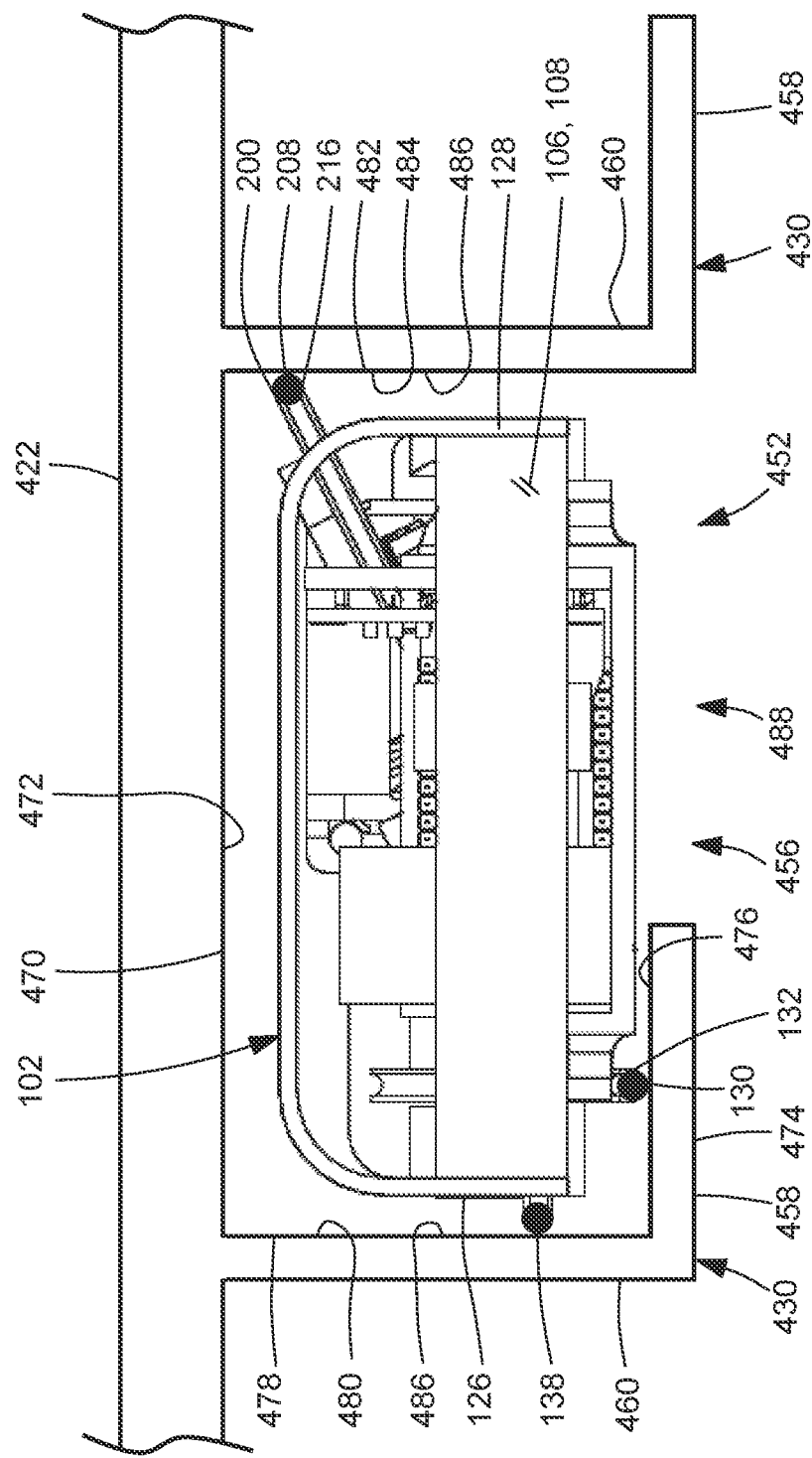
FIG. 6 is a magnified end view of the portion of the wing box identified by reference number 6 of FIG. 4 and illustrating an example of an upper channel crawler supported within an upper channel (e.g., a stringer channel) on the upper side of the wing box.

Referring to FIGS. 6-18, shown is an example of an upper channel crawler 102 configured to move through an upper channel 452. As shown in FIG. 6, the upper channel 452 is a stringer channel 456 having a channel cross-sectional envelope bounded by a pair of stringers 430 and a section of an upper skin panel 422 that extends between the stringers 430. Each stringer 430 has a stringer web 460 (i.e., a non-horizontal surface 486) extending downwardly from the upper skin panel 422. The bottom portion of each stringer 430 has a stringer flange 458 extending laterally from the stringer web 460. In other examples not shown, the upper portion of the stringer 430 may have an additional stringer flange 458 that can be used to couple (e.g., bond and/or fasten) the stringer 430 to the upper skin panel 422.

In FIG. 6, the upper channel 452 has a channel upper side 470 having a channel upper surface 472 defined by the upper skin panel 422. In addition, the upper channel 452 has a channel lower side 474 having a channel lower surface 476 defined by the stringer flange 458. A channel opening 488 extends lengthwise along the channel lower side 474. The upper channel 452 has a channel first side 478 having a channel first side surface 480, and a channel second side 482 having a channel second side surface 484, respectively defined by the stringer webs 460 of the stringers 430 on opposite sides of the upper channel 452.

In the example of FIGS. 6-7 and FIGS. 19-20, the stringer webs 460 are parallel to each other and are vertically oriented. However in other examples not shown, the stringer webs 460 can be non-parallel to each other when viewed from an end view perspective and/or the stringer webs 460 can be non-vertically oriented. Furthermore, a stringer 430 can have any one of a variety of alternative cross-sectional shapes and sizes and is not limited to the cross-sectional shape and size shown in the figures.

Referring to FIGS. 6-17, the upper channel crawler 102 has an upper channel carriage 108 which has a carriage first end 122, a carriage second end 124, a carriage first side 126, a carriage second side 128, a carriage upper side 118, and a carriage lower side 120. The upper channel carriage 108 has wheels 130 including a pair of vertical wheels 132. Each of the vertical wheels 132 is rotatable about a horizontal axis. The vertical wheels 132 protrude from the carriage lower side 120 proximate the carriage first end 122 and proximate the carriage second end 124. The vertical wheels 132 are configured to engage the channel lower surface 476 of the upper channel 452, which is defined by the stringer flange 458 of one of the stringers 430 as shown in FIG. 6.

Figure 13:
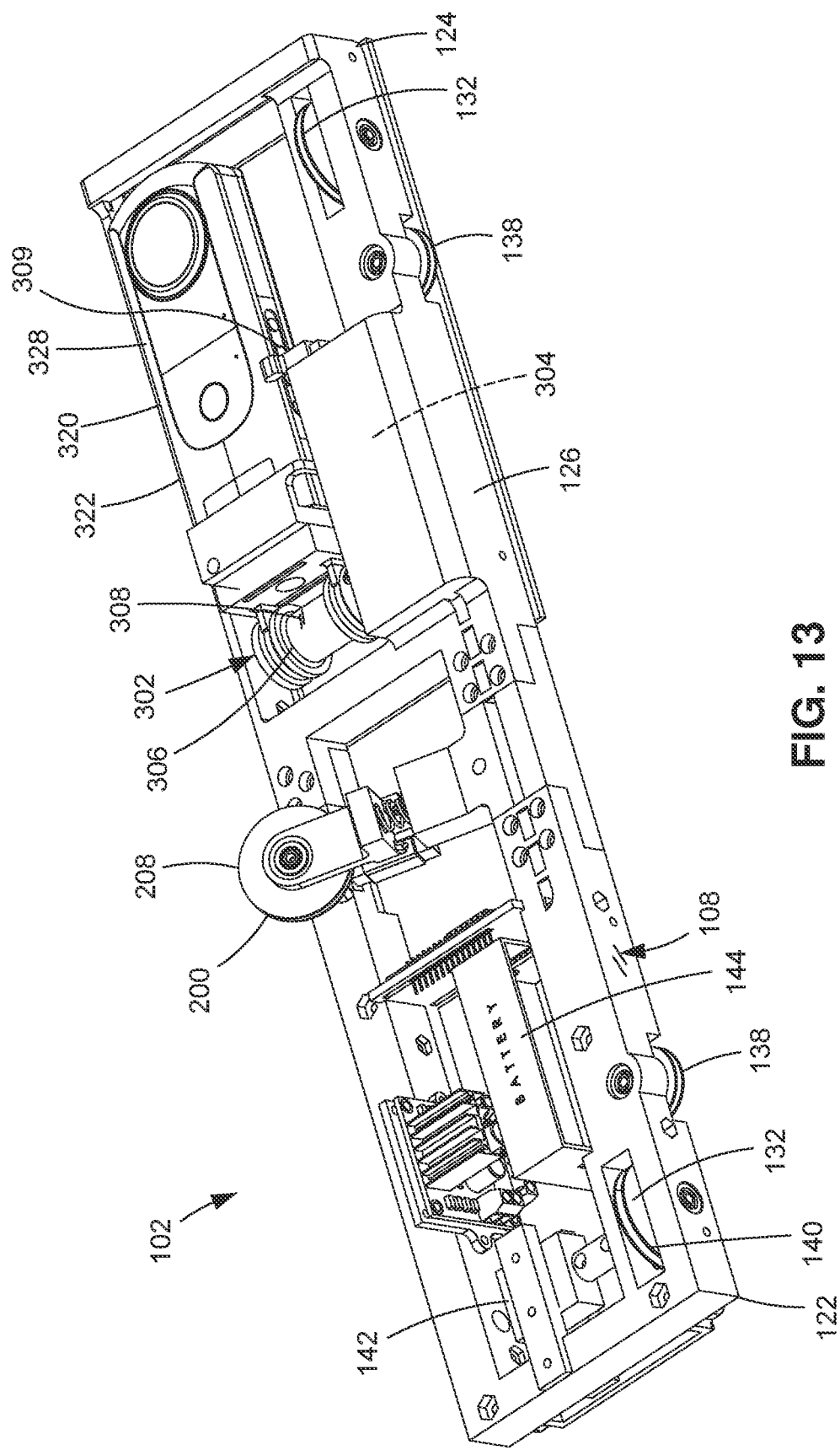
FIG. 13 is a top-down perspective view of the upper channel crawler with cover panels removed to illustrate the vertical wheels, the crane mechanism, and a wheel drive motor for powering a drive wheel for propelling the upper channel crawler through the stringer channel.

In addition to vertical wheels 132, the upper channel carriage 108 has wheels 130 configured to engage opposing side surfaces of the upper channel 452 through which the upper channel carriage 108 is configured to move. For example, the upper channel carriage 108 has a pair of horizontal wheels 138 (FIG. 13), each of which is rotatable about a vertical axis. The pair of horizontal wheels 138 protrude from the carriage first side 126 (FIG. 13) respectively proximate the carriage first end 122 (FIG. 13) and the carriage second end 124 (FIG. 13). The horizontal wheels 138 are configured to engage the channel first side surface 480 of the upper channel 452 which is defined by the stringer web 460 of one of the stringers 430 as shown in FIG. 6.

In any one of the channel crawler 100 configurations disclosed herein, at least one of the above-mentioned wheels 130 is a drive wheel 140 (FIG. 13) configured to propel the channel crawler 100 in a lengthwise direction through a channel 450. For example, in the upper channel crawler 102 of FIG. 13, one of the vertical wheels 132 is a drive wheel 140 and the remaining vertical wheel 132 and pair of horizontal wheels 138 are passive wheels that are freely rotatable. The drive wheel 140 is driven by a wheel drive motor 142 (FIG. 13) which, in the example shown, is a brushless direct-current (BLDC) motor. However, the wheel drive motor 142 may be provided in alternative configurations, and is not limited to a BLDC motor.

In the example shown, the wheel drive motor 142 is powered by a battery 144 (FIG. 13). As described below, the battery 144 can also be used for powering other components and mechanisms of a channel crawler 100 such as the stabilizing mechanism 200, the deployment mechanism 300 and/or the operational device 320. In the example shown, the battery 144 is a lithium phosphate battery. However, the wheel drive motor 142 and other components and mechanisms of the channel crawler 100 can be powered by alternative power sources, including any one of a variety of alternative battery configurations. In some examples not shown, a channel crawler 100 may be powered by a remote power source (not shown) to which the channel crawler 100 is tethered via a power cord (not shown).

Referring to FIGS. 6-17, the upper channel crawler 102 includes the above-mentioned stabilizing mechanism 200 which is provided as a diagonally-mounted element 208 configured to engage the channel second side surface 484 of the upper channel 452 in a manner urging the horizontal wheels 138 against the channel first side surface 480 for restricting vertical movement of the upper channel crawler 102 relative to the upper channel 452. In this regard, the diagonally-mounted element 208 is biased against the channel second side surface 484 in a manner retaining the upper channel crawler 102 within the upper channel 452, and preventing the upper channel crawler 102 from falling out of the upper channel 452 through the channel opening 488 in the channel lower side 474.

As shown in FIG. 6, the diagonally-mounted element 208 protrudes from the carriage second side 128 at an orientation that is non-perpendicular to the vertical wheels 132. The diagonally-mounted element 208 contacts the channel second side surface 484 at a location above the point where the horizontal wheels 138 contact the channel lower surface 476. When the upper channel crawler 102 is viewed from a top-down perspective as shown in FIG. 14, the diagonally-mounted element 208 is located between the horizontal wheels 138, thereby defining a mechanically stable triangular arrangement of contact points for securing the upper channel crawler 102 within the upper channel 452.

Figure 17:
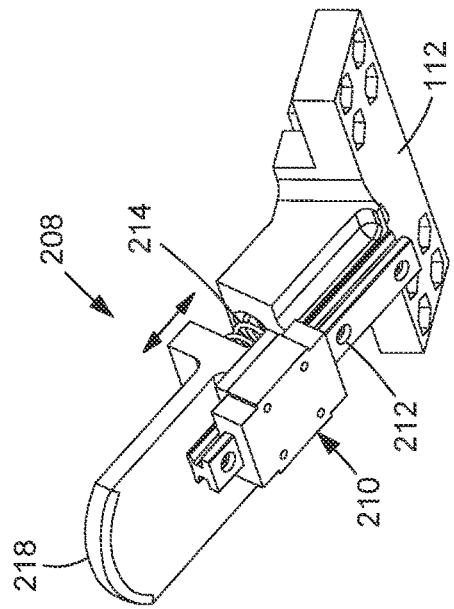
FIG. 17 shows an example of the diagonally-mounted element configured as a wheel.

In the example of FIGS. 6-17, the diagonally-mounted element 208 is an outwardly-biased diagonal wheel 216 configured to roll along the channel second side surface 484, as shown in FIG. 14. As shown in FIG. 17, the diagonal wheel 216 is movable in a diagonal direction along a guide rail 212 of a slide mechanism 210. The slide mechanism 210 includes a compression spring 214 for biasing the diagonal wheel 216 against the channel second side surface 484. The spring-loaded arrangement of the diagonally-mounted element 208 allows it to retract during initial placement of the upper channel crawler 102 into an upper channel 452, and naturally extend into engagement against a stringer web 460 once the upper channel crawler 102 is inside the upper channel 452.

Figure 18:
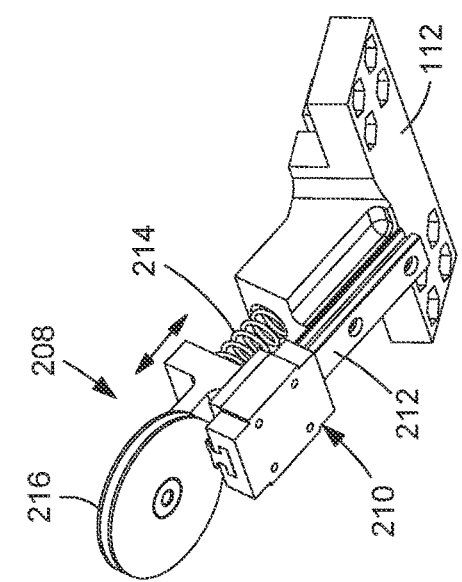
FIG. 18 shows an example of the diagonally-mounted element configured as a slider arm.

FIG. 18 shows an example in which the diagonally-mounted element 208 is an outwardly-biased diagonal slider arm 218 configured to slide along the channel second side surface 484. The outer end of the slider arm 218 is preferably comprised of a low friction material or coating that facilitates sliding motion of the diagonal slider arm 218 along the channel second side surface 484.

Figure 16:
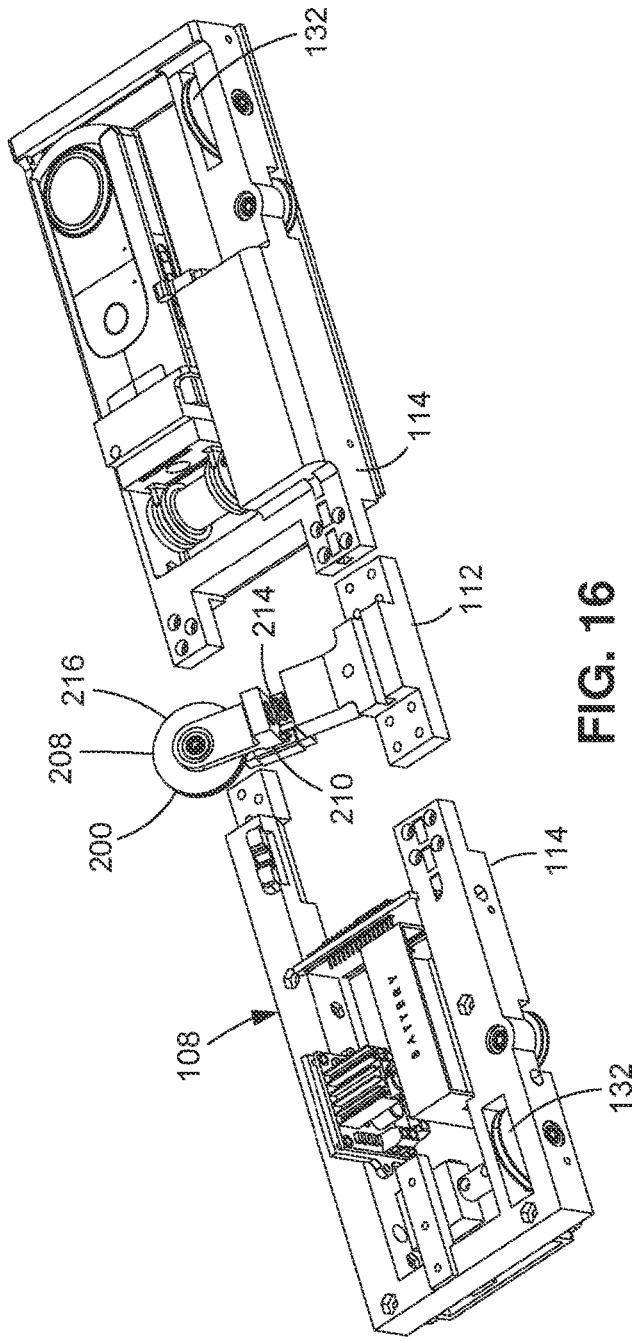
FIG. 16 is a perspective view of an example of an upper channel crawler having a carriage (i.e., frame) that is separated into three portions including a diagonally-mounted element portion for supporting a diagonally-mounted element.

FIG. 16 shows an alternative arrangement of the upper channel crawler 102 in which the upper channel carriage 108 is separated into three carriage sections including an intermediate carriage section 112 and a pair of end carriage sections 114. By separating the upper channel carriage 108 into three separate carriage sections, different configurations of the diagonally-mounted element 208 (e.g., FIGS. 17, 18) can be easily substituted into the upper channel carriage 108.

Figure 7:
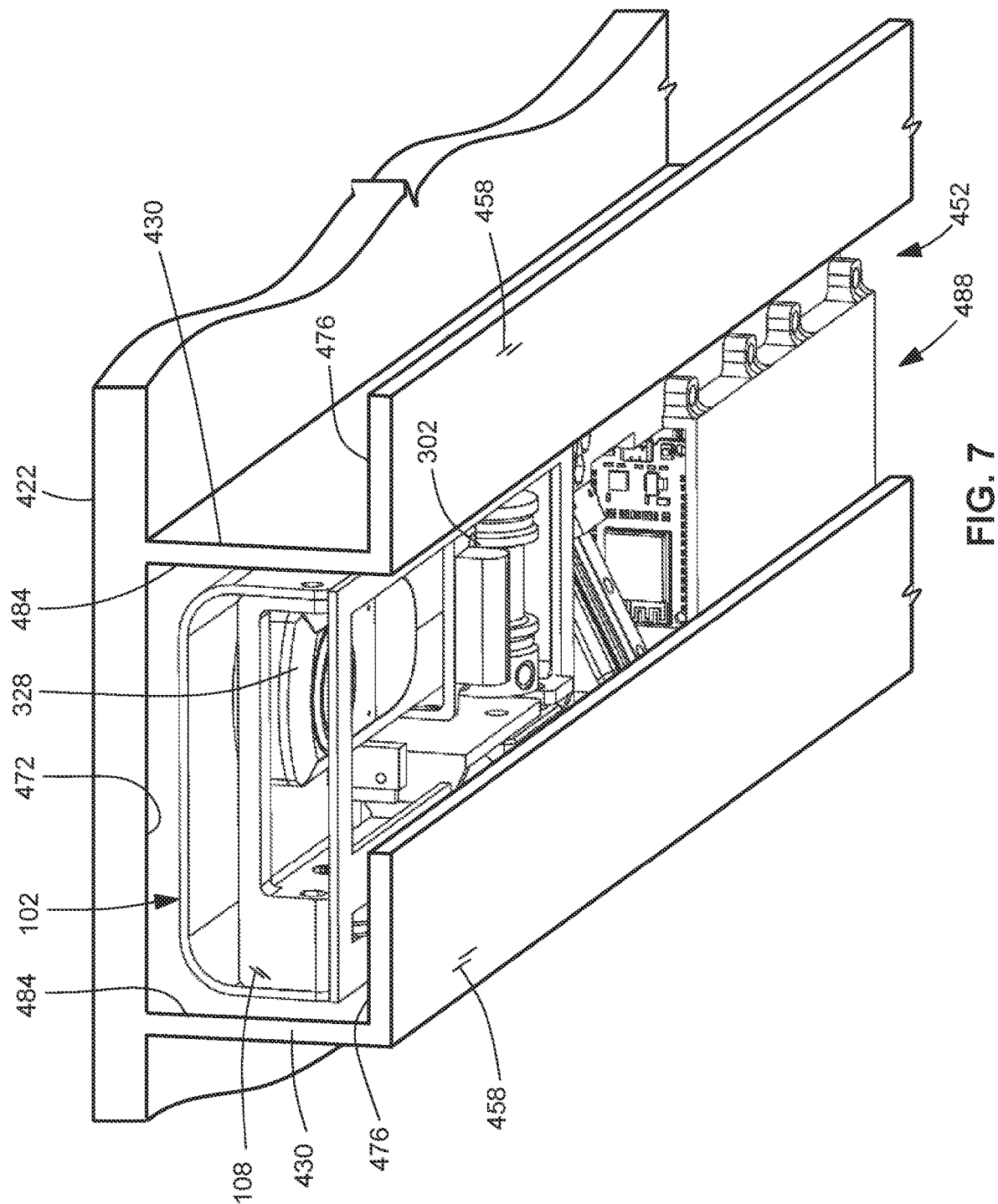
FIG. 7 is a bottom-up perspective view of the upper channel crawler in the stringer channel of FIG. 6.

Referring still to FIGS. 6-18, the upper channel crawler 102 includes the above-mentioned deployment mechanism 300 (FIG. 8) which is configured as a crane mechanism 302 for lowering the operational device 320 (FIG. 8) down from the carriage lower side 120 (FIG. 8) and out of the channel opening 488 (FIG. 7) of the upper channel 452 (FIG. 7). In the example shown, the operational device 320 is an upper camera 328 configured to capture images of the wing box 416, as described below. The crane mechanism 302 has a cable 308 (FIGS. 10-11) that is windable on a spool 306 (FIG. 8) mounted within the upper channel carriage 108. One end of the cable 308 is attached to the upper camera 328. The crane mechanism 302 has a crane motor 304 (FIG. 8) that rotates the spool 306 in opposite directions to respectively raise and lower the upper camera 328 from the upper channel crawler 102. In the example of FIG. 5, the crane mechanism 302 is configured to lower the upper camera 328 from the carriage lower side 120 into the space between the upper channels 452 and the lower channels 454 of the wing box 416.

Figure 11:
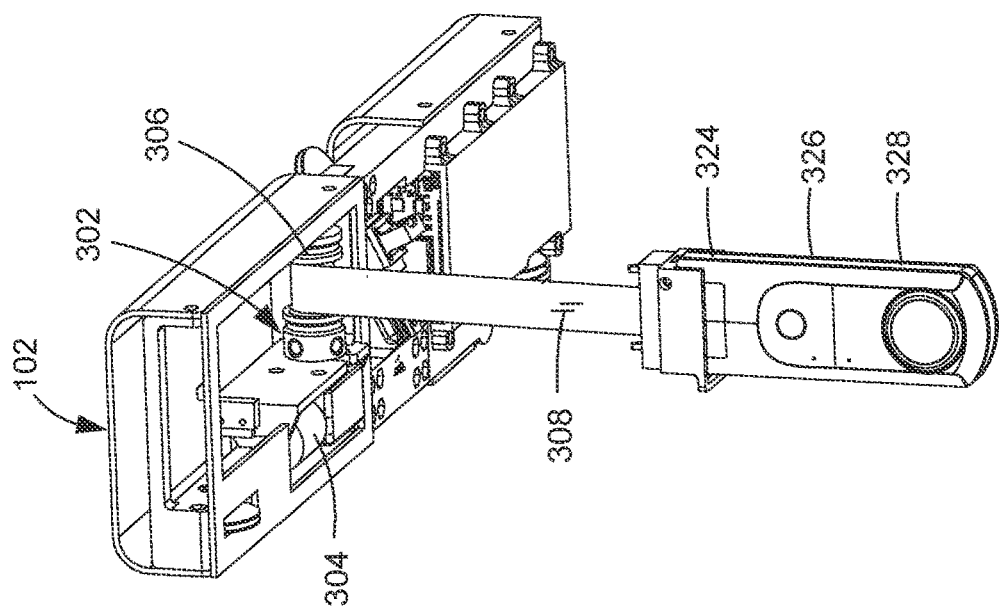
FIG. 11 shows the camera in a deployed position suspended from the upper channel crawler.
Figure 10:
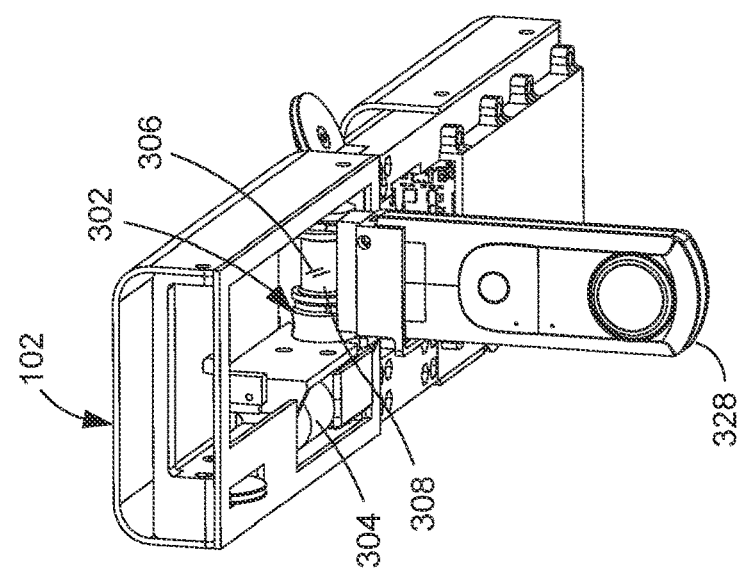
FIG. 10 shows an intermediate stage of deploying the camera from the upper channel crawler.
Figure 9:
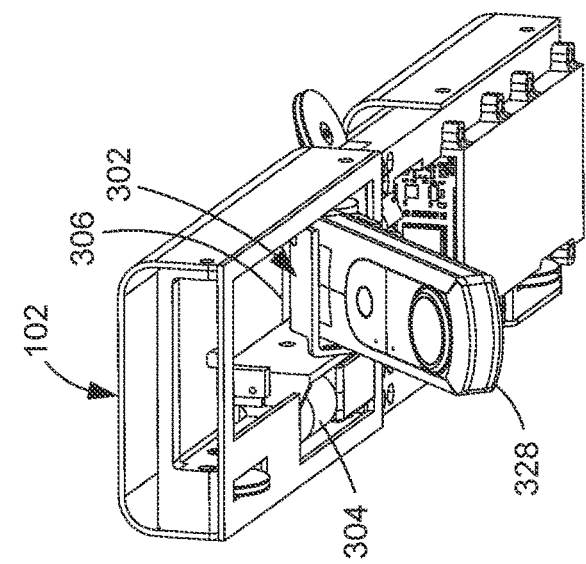
FIG. 9 shows an initial stage of deploying the camera from its stowed position within the upper channel crawler.
Figure 12:
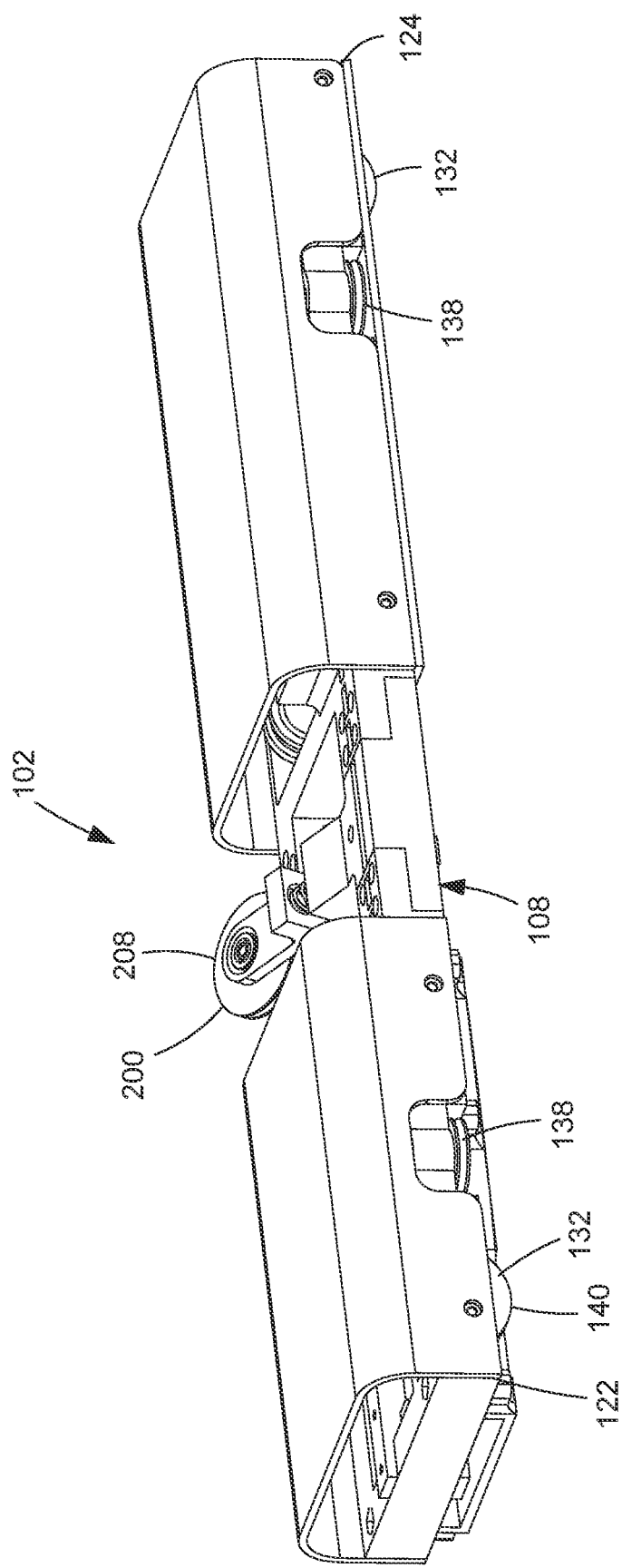
FIG. 12 is a top-down perspective view of the upper channel crawler illustrating vertical wheels and horizontal wheels configured to respectively engage a channel lower surface and a channel first side surface of the stringer channel, and further illustrating a diagonally-mounted wheel biased against a channel second side surface in a manner retaining the upper channel crawler within the stringer channel.

FIGS. 8-11 illustrate the process of lowering the upper camera 328 from the upper channel crawler 102. FIG. 8 shows the upper camera 328 in its stowed position 322 in which the upper camera 328 is maintained in a horizontal orientation within the upper channel carriage 108. FIG. 9 shows an initial stage of deploying the upper camera 328 during which the upper camera 328 is rotated downwardly via rotation of the spool 306. FIG. 10 shows an intermediate stage of deploying the upper camera 328 from the upper channel crawler 102 in which the upper camera 328 is suspended by the cable 308. FIG. 11 shows further lowering of the upper camera 328 to a deployed position 324 at a desired vertical level. To move the upper camera 328 from the deployed position 324 back to its stowed position 322, the crane motor 304 rotates the spool 306 in an opposite direction, which raises the upper camera 328. A limit switch 309 (FIG. 13) on the upper channel carriage 108 detects when the upper camera 328 is at its stowed position 322, at which point a signal from the limit switch 309 deactivates the crane motor 304 to thereby stop rotation of the spool 306.

In any one of the examples disclosed herein, the camera 326 of a channel crawler 100 is configured to capture images of structure 402 (FIG. 5) and/or hardware 404 (FIG. 4) located proximate a channel 450 and/or within a confined space. The camera 326 can have a relatively large field of view (e.g., 360 degrees). The camera 326 can also have a lighting element (not shown) to illuminate the imaged areas. In one example, the lighting element is a light-emitting-diode (LED) strip (not shown). Alternatively or additionally, lighting elements such as LED strips can be mounted on a carriage (e.g., the upper channel carriage 108 and/or the lower channel carriage 110) for additional illumination.

The camera 326 (e.g., upper camera 318, lower camera 332) can be configured to capture still images and/or video. In one example, the images captured by a camera 326 can be used for the purpose of inspecting the interior of a wing 414, such as a wing tank 432 that is integral with a wing box 416. For example, the camera 326 may be implemented for capturing images of the structure 402 that defines the wing tank 432 such as the upper and lower skin panels 422, 424, the stringers 430, the wing ribs 426, and the forward and aft spars 418, 420. In addition, the camera 326 can capture images of hardware 404 such as fasteners (not shown) and systems 406 (e.g., tubing 407, fittings, etc.) within wing tank 432, and/or images of sealant on structural joints, fasteners, and other components within the wing tank 432.

Figure 19:
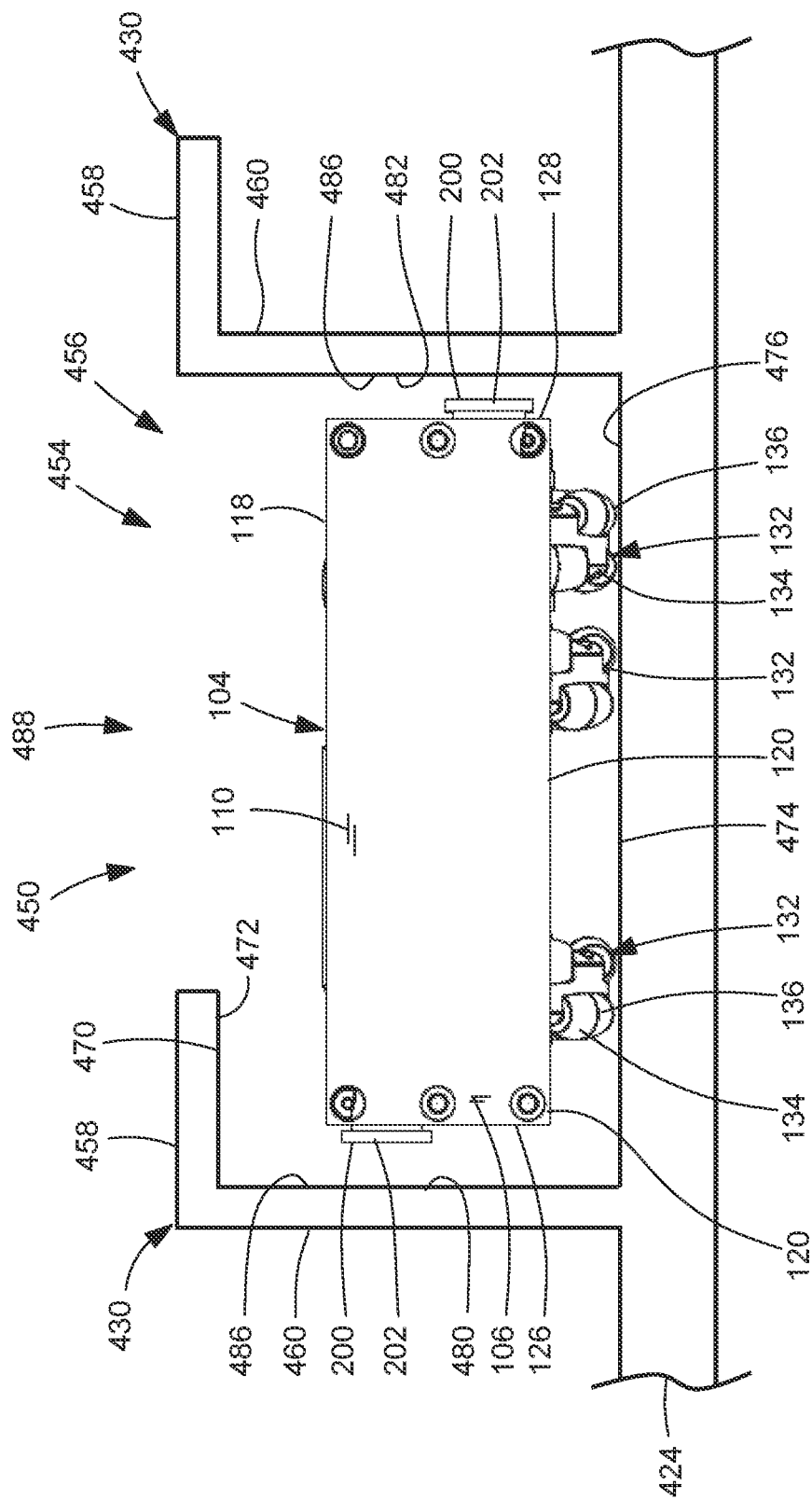
FIG. 19 is a magnified end view of the portion of the wing box identified by reference number 19 of FIG. 4 and illustrating an example of the lower channel crawler supported within a lower channel (e.g., a stringer channel) on the lower side of the wing box.
Figure 20:
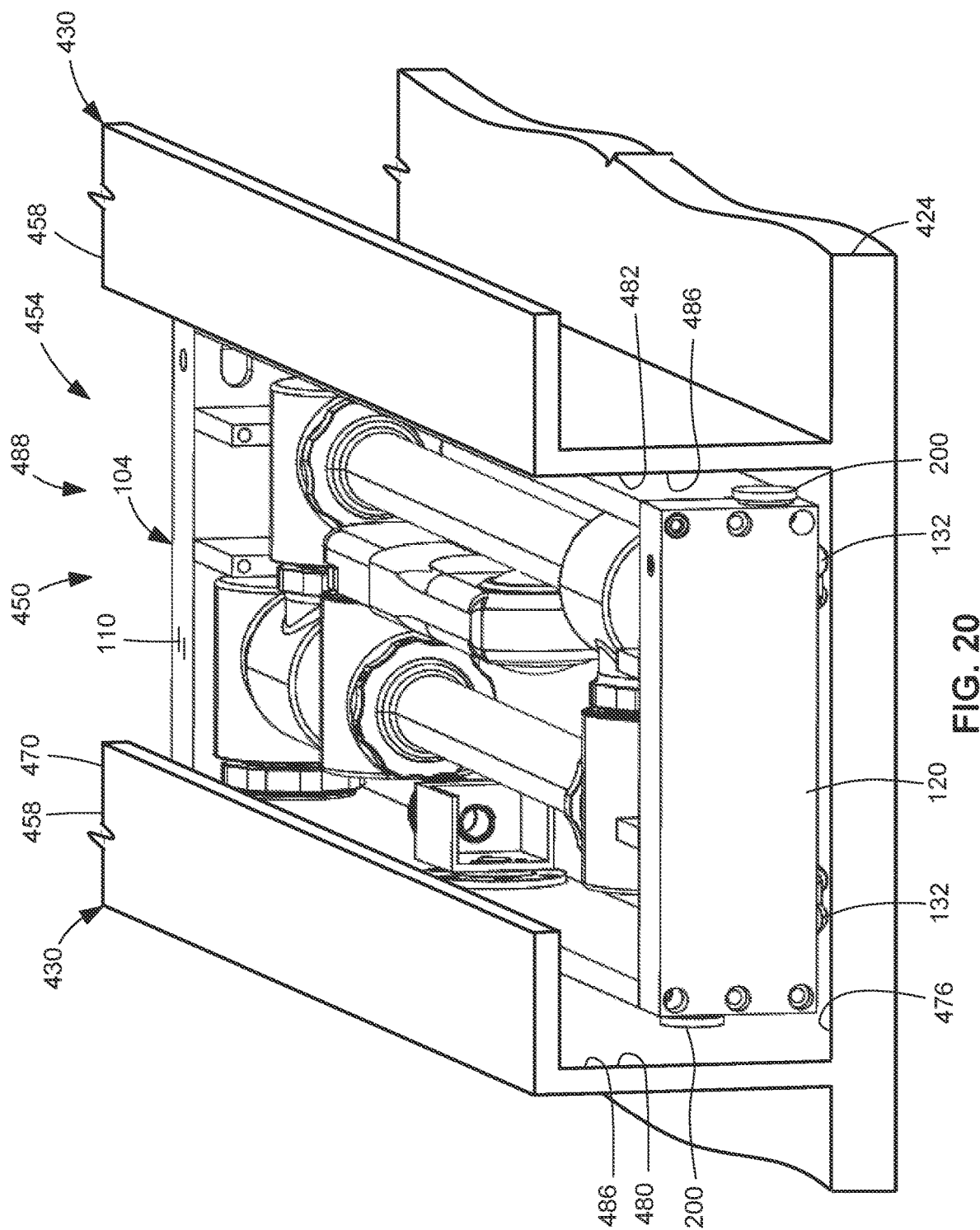
FIG. 20 is a top-down perspective view of the lower channel crawler of FIG. 19 mounted within the stringer channel.

Referring to FIGS. 19-27, shown is an example of the lower channel crawler 104 configured to move through a lower channel 454. In FIGS. 19-20, the lower channel 454 is a stringer channel 456 bounded by a pair of stringers 430 and a lower skin panel 424 that extends between the stringers 430. The stringers 430 are configured similar to the above-described arrangement shown in FIG. 6. Each stringer 430 has a stringer web 460 (i.e., a non-horizontal surface 486) extending upwardly from the lower skin panel 424. The upper portion of each stringer 430 has a stringer flange 458 extending laterally from the stringer web 460. The lower channel 454 has a channel lower side 474 having a channel lower surface 476 defined by the lower skin panel 424. In addition, the lower channel 454 has a channel upper side 470 having a channel upper surface 472 defined by the stringer flange 458 of one of the stringers 430. The lower channel 454 has a channel opening 488 extending lengthwise along the channel upper side 470. The lower channel 454 has a channel first side surface 480 and a channel second side 482 surface respectively defined by the pair of stringer webs 460.

Similar to the upper channel crawler 102, the lower channel crawler 104 has a lower channel carriage 110 which has a carriage first end 122, a carriage second end 124, a carriage first side 126, a carriage second side 128, a carriage upper side 118, and a carriage lower side 120 as shown in FIG. 21. The lower channel carriage 110 has at least three vertical wheels 132 (FIG. 19), each of which is rotatable about a horizontal axis and which protrude from the carriage lower side 120. In the example of FIG. 24, two of the vertical wheels 132 are located proximate the carriage first end 122 and the third vertical wheel 132 is located proximate the carriage second end 124. The vertical wheels 132 are configured to engage the channel lower surface 476 (FIG. 19) which is defined by the lower skin panel 424 as shown in FIG. 19. For examples in which the stringer 430 is attached to the lower skin panel 424 via a stringer flange (not shown), the vertical wheels 132 engage with the stringer flange which serves as the channel lower surface 476. The vertical wheel 132 at the carriage first end 124 is a drive wheel 140 and the remaining vertical wheels 132 are passive wheels. Similar to the upper channel crawler 102, the drive wheel 140 (FIG. 24) of the lower channel crawler 104 is driven by a wheel drive motor 142 (FIG. 24).

In the example of FIG. 19, the vertical wheels 132 are omnidirectional wheels 134 configured to allow lateral movement of the lower channel crawler 104 for accommodating directional changes of a channel 450. For example, FIG. 2 illustrates a slight bend in the spanwise direction each of the stringer channels 456 due to the bend in the stringers 430. In FIG. 19, each omnidirectional wheel 134 includes a plurality of circumferentially arranged discs or rollers 136, each of which is oriented perpendicular to the rotational direction of the omnidirectional wheel 134, and which allows for lateral movement of the lower channel carriage 110 within the lower channel 454. As mentioned above, the circumferentially arranged rollers 136 allow for small-angle changes (e.g., less than 10 degrees) in the direction that the lower channel crawler 104 moves through the lower channel 454.

Referring still to FIGS. 19-27, the lower channel crawler 104 has a stabilizing mechanism 200 in the form of selectively-extendible stopper arms 202. The stopper arms 202 are configured to engage non-horizontal surfaces 486 of the lower channel 454 to thereby arrest or prevent movement of the lower channel carriage 110 relative to the lower channel 454. As shown in FIGS. 26-27, the stopper arms 202 comprise a pair of horizontally oriented linear actuators 204 mounted to the carriage first end 122 (FIG. 22) and a pair of horizontally oriented linear actuators 204 to the carriage second end 124 (FIG. 22). The pair of linear actuators 204 at each end of the carriage 106 are configured to extend simultaneously in opposite directions into engagement respectively with the stringer webs 460 (FIG. 26) on opposite sides of the lower channel 454. An elastomeric pad 206 (e.g., rubber pad) can be mounted on the end of each stopper arm 202 to prevent scratching or damage to the surfaces of the stringer webs 460.

The engagement of the stopper arms 202 with the non-horizontal surfaces 486 of the lower channel 454 stabilizes the lower channel carriage 110 against movement relative to the lower channel 454. The stopper arms 202 can be extended once the lower channel crawler 104 arrives at any location along the lower channel 454 as may be determined by an operator (e.g., an inspection mechanic). Alternatively or additionally, the lower channel crawler 104 can be stopped at one or more predetermined locations along the lower channel 454. The stopper arms 202 can be extended prior to deployment of the operational device 320 (e.g., lower camera 332) from its stowed position 322 within the carriage 106 to a deployed position 324 (FIG. 5) outside the lower channel 454 via the deployment mechanism 300.

In FIGS. 19-27, the deployment mechanism 300 of the lower channel crawler 104 is a robotic arm 310 configured to raise the operational device 320 (e.g., the lower camera 332) up from the carriage upper side 118 and out of the channel opening 488 on the channel upper side 470. The robotic arm 310 has one or more arm segments 312 connected in series by arm joints. The robotic arm 310 is mounted to the lower channel carriage 110 at one end, and the free end of the robotic arm 310 is configured to support the operational device 320 (e.g., lower camera 332). Similar to the above-described upper camera 328 of the upper channel crawler 102, the lower camera 332 of the lower channel crawler 104 can have a relatively large field of view (e.g., 360 degrees) and is configured to capture images of the structure 402, hardware 404, and/or systems 406 proximate the channel 450. A lighting element (e.g., an LED strip—not shown) can be included with the lower camera 332 and/or the lower channel crawler 104 to illuminate the confined space (e.g., the wing tank 432) during imaging.

The upper channel crawler 102 and the lower channel crawler 104 can be operated in a complementary manner wherein the robotic arm 310 of the lower channel crawler 104 can raise the lower camera 332 into a position for inspecting portions of a confined space that are outside the field of view of the upper camera 328. For example, FIG. 5 shows the upper camera 328 lowered from the upper channel crawler 102 to an approximate mid-height of the wing box 416. At this location, certain portions of the wing box 416 are hidden from the upper camera field of view 330, such as areas of the wing box 416 located behind the tubing 407 that extends horizontally through the rib bay 428. However, the robotic arm 310 of the lower channel crawler 104 is able to move the lower camera 332 into a position where the areas that are hidden from the upper camera 328 are within the lower camera field of view 334.

For any one of the channel crawler 100 configurations disclosed herein, control of the drive wheel 140, the stabilizing mechanism 200, the deployment mechanism 300, and/or the operational device 320 is performed via remote control and/or preprogrammed instructions. For example, any one or more of the above-noted components and/or mechanisms of any one of the presently disclosed channel crawlers 100 can be remotely controlled via radio signals (e.g., wirelessly). For wireless control of a channel crawler 100, a circuit board (not shown) with microcontroller and Wi-Fi module is mounted to the carriage 106 and is configured to receive wireless commands that are transmitted to the wheel drive motor 142, the stabilizing mechanism 200 (e.g., the stopper arms 202), the deployment mechanism 300 (e.g., crane motor 304. robotic arm 310), and the operational device 320 (e.g., the camera 326).

Alternatively or additionally, any one of the presently disclosed channel crawlers 100 can be controlled via preprogrammed instructions. For example, an on-board controller (not shown) mounted on a channel crawler 100 can be preprogrammed with instructions for controlling the wheel drive motor 142 for moving the channel crawler 100 to one or more predetermined locations along a channel 450. The controller can also be preprogrammed with instructions for deploying the stabilizing mechanism 200 (e.g., the linear actuators 204) once the channel crawler 100 stops at a predetermined location along the channel prior to deployment of the operational device 320 (e.g., camera) from its stowed position 322. In addition, the controller can be preprogrammed with instructions for operating the deployment mechanism 300 (e.g., crane motor 304, robotic arm 310) to move the operational device 320 (e.g., the camera 326) to a predetermined three-dimensional position within the confined space (e.g., wing tank 432), after which preprogrammed instructions from the controller can command the camera 326 to capture images.

The preprogrammed instructions can include the option for an operator (e.g., an inspection mechanic) to manually pause and/or override a preprogrammed movement or action of one of the above-mentioned components and/or mechanisms of a channel crawler 100. For example, an inspection mechanic can monitor the operation of a channel crawler via a display screen of a tablet of laptop computer (not shown), and override preprogrammed operation of the wheel drive motor 142 in a manner allowing adjustment of the point along a channel 450 where the channel crawler 100 stops and deploys its operational device 320. In another example, an inspection mechanic can pause and/or manually override preprogrammed operation of the deployment mechanism 300 (e.g., the crane motor 304 or the robotic arm 310) and adjust the preprogrammed three-dimensional position of the camera 326 when deployed.

In addition to, or as an alternative to, wireless control or preprogrammed control, one or more components and/or mechanisms of a channel crawler 100 can be remotely controlled via a control wire 146 extending from the channel crawler 100 inside a confined space to a console (e.g., a tablet or laptop computer—not shown) located outside of the confined space. For example, FIGS. 22-23 show an example of the lower channel crawler 104 in which the robotic arm 310 can be remotely controlled via a control wire 146. The control wire 146 passes through a right-angle connector 148 mounted to the side of the upper channel carriage 108, and extends to an opening (e.g., an access door—not shown) in the lower skin panel 424 where it passes out of the wing 414 and is coupled to a console (e.g., a tablet—not shown) that can be operated by an inspection mechanic for controlling the channel crawler 100.

Figure 28:
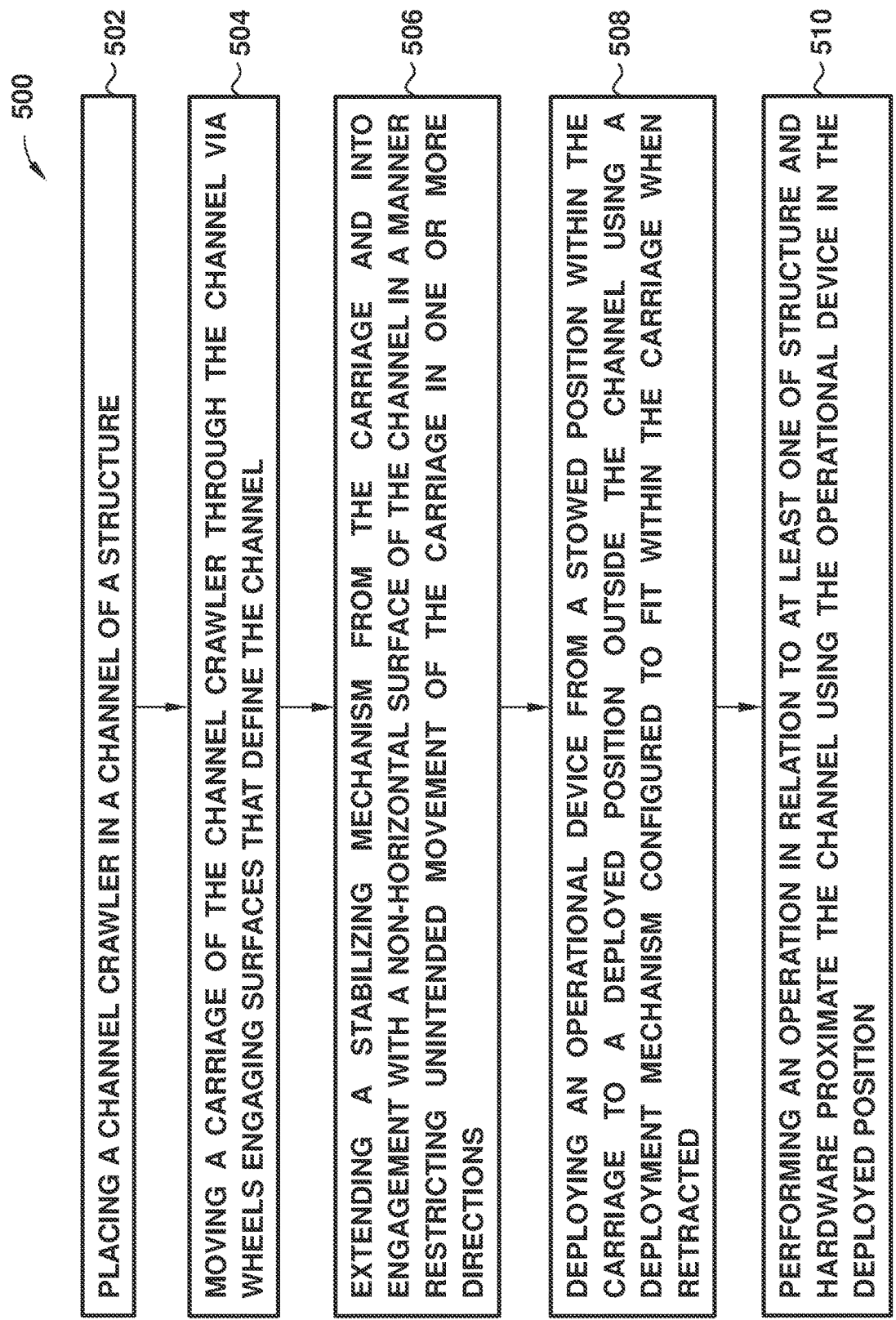
FIG. 28 is a flowchart of operations included in method of using a channel crawler that is movable through a stringer channel for performing an operation in relation to structure and/or hardware located proximate the stringer channel using an operational device (e.g., a camera) deployed from the channel crawler.

Referring to FIG. 28, shown is a method 500 of performing an operation, such as in a confined space or a difficult-to-access location. The method 500 initially includes step 502 of placing one or more channel crawlers 100 respectively in channels 450 of a structure 402. In the example of a wing 414, the upper channel crawler 102 and the lower channel crawler 104 can be inserted into the wing by separately passing the upper and lower channel crawlers 102, 104 through an access hole (not shown) in the lower skin panel 424 by hand or with the assistance of a pole (not shown). The pole can be a simple pole or a telescoping pole, and can have clamping jaws on one end for clamping onto the upper or lower channel crawler 102, 104 during insertion into the wing box 416 and/or during placement in a stringer channel 456. The upper and lower cameras 330, 332 can be turned on during insertion of the upper and lower channel crawlers 102, 104 into the wing box 416 to provide live images or video of the wing box 416 interior to an inspection mechanic who can remotely view the images or video on a console or display device (e.g., a tablet or laptop—not shown) to assist in the placement of the upper and lower channel crawlers 102, 104 in their respective upper and lower channels 452, 454.

As shown in FIG. 28, the basic steps of the method 500 include steps 502, 504, 506, 508, and 510. After placing a channel crawler 100 in a channel 450 in step 502, step 504 of the method 500 includes moving a carriage 106 of the channel crawler 100 through the channel 450 via wheels 130 engaging surfaces that define the channel 450. In the example illustrated in the figures, step 504 comprises moving the carriage 106 of a channel crawler 100 through a stringer channel 456 of a wing 414 of an aircraft 400. As described above, the stringer channel 456 is defined by a parallel pair of stringers 430 and a skin section of a skin panel that extends between the stringers 430. Step 506 of the method 500 includes extending a stabilizing mechanism 200 from the carriage 106 into engagement with a non-horizontal surface 486 of the channel 450 in a manner restricting unintended movement of the carriage 106 in one or more directions. Step 508 of the method 500 includes deploying an operational device 320 from a stowed position 322 within the carriage 106 to a deployed position 324 outside the channel 450 using a deployment mechanism 300 configured to fit within the carriage 106 when retracted in the stowed position 322. Step 510 of the method 500 includes performing an operation in relation to at least one of structure 402 and hardware 404 proximate the channel 450 using the operational device 320 in the deployed position 324.

For the upper channel crawler 102 of FIGS. 6-18, step 502 of the method 500 comprises placing the upper channel crawler 102 in an upper channel 452, such as by hand or with the assistance of a pole (not shown). Step 504 comprises engaging vertical wheels 132 and horizontal wheels 138 of the upper channel carriage 108 to surfaces on a first side of the upper channel 452. For example, as described above, step 504 comprises engaging vertical wheels 132 and horizontal wheels 138 respectively to a channel lower surface 476 and a channel first side surface 480 of the upper channel 452. Step 504 also includes propelling the upper channel crawler 102 through the upper channel 452 using one of the wheels 130 configured as a drive wheel 140. As described above, one of the vertical wheels 132 of the upper channel crawler 102 is driven by a wheel drive motor 142 while the remaining wheels 130 are passive wheels that are freely rotatable.

For the upper channel crawler 102, step 506 of extending the stabilizing mechanism 200 comprises engaging a diagonally-mounted element 208 to a surface on a second side of the upper channel 452 in a manner urging the horizontal wheels 138 against the first side of the upper channel 452 in a manner restricting vertical movement of the upper channel carriage 108 relative to the upper channel 452. In the example of FIGS. 6-17, the process of engaging the diagonally-mounted element 208 to the surface on the second side of the upper channel 452 comprises biasing a diagonal wheel 216 into rolling engagement with the channel second side surface 484. Alternatively, engagement of the diagonally-mounted element 208 can comprise biasing a diagonal slider arm 218 of FIG. 18 into sliding engagement with the channel second side surface 484. As described above, a compression spring biases the diagonally-mounted element against the channel second side surface 484.

For the upper channel crawler 102, step 508 of deploying the operational device 320 comprises lowering the operational device 320 down from the carriage lower side 120 and out of the channel opening 488 using a deployment mechanism 300. In shown in the example of FIGS. 8-11, the process of lowering the operational device 320 down from the carriage lower side 120 is performed using a crane mechanism 302. As described above, the crane mechanism 302 has a cable 308 that is windable on a spool 306 mounted within the carriage 106, and the operational device 320 is attached to the end of the cable 308. Rotation of the spool 306 via the crane motor 304 causes the operational device 320 to raise and lower from the channel crawler 102, depending on the direction of rotation of the spool 306.

For the upper channel crawler 102, step 510 of performing an operation using the operational device 320 in the deployed position 324 comprises capturing images of the structure 402 and/or hardware 404 using an upper camera 328. As indicated above, images captured by the upper camera 328 can be still images and/or video as may be desired to facilitate the inspection of a confined space. For example, images captured by the upper camera 328 can be used for the purpose of inspecting the interior of a wing tank 432 of an aircraft 400. The images can be used for inspecting the structure 402 that defines the wing tank 432 (e.g., the stringers 430, wing ribs 426, forward and aft spars 418, 420, and upper and lower skin panels 422, 424, etc.). In addition, the images can be used for inspecting hardware 404 such as fasteners, systems 406 (e.g., tubing 407, wiring, etc.) that passes through wing tank 432, and/or inspecting sealant applied to the above noted items. However, as indicated above, step 510 is not limited to performing inspections using a camera 326, but can include performing any one of a variety of other types of operations including, but not limited to, removing FOD using a vacuum device (not shown), re-applying sealant using a sealant applicator (not shown), performing integrity tests on the structure 402 and/or hardware 404 using a testing instrument (not shown), and any one of a variety of other types of operations.

For the lower channel crawler 104 of FIGS. 19-27, step 502 of the method 500 comprises placing lower channel crawler 104 in a lower channel 454, such as by hand or with the assistance of a pole (not shown). Step 504 of moving a carriage 106 of a channel crawler 100 through a channel 450 comprises engaging vertical wheels 132 of a lower channel carriage 110 of the lower channel crawler 104 to a channel lower surface 476 of a lower channel 454. As described above and shown in FIG. 19, the lower channel carriage 110 has three vertical wheels 132 which engage the channel lower surface 476 defined by the lower skin panel 424. One of the vertical wheels 132 is driven by a wheel drive motor for propelling the lower channel crawler 104 forward or backward through the lower channel 454. Step 504 can optionally include allowing the lower channel carriage 110 to move in a lateral direction using the vertical wheels 132 configured as omnidirectional wheels 134 (FIG. 19), and thereby accommodate small directional changes in the lower channel 454.

For the lower channel crawler 104, step 506 of extending the stabilizing mechanism 200 comprises extending one or more stopper arms 202 into engagement with one or more non-horizontal surfaces 486 of the channel 450 in a manner arresting movement of the carriage 106 relative to the channel 450. For example, as shown in FIGS. 26-27, step 506 includes extending a pair of linear actuators 204 in a lateral direction from each end of the lower channel carriage 110. On each end of the lower channel carriage 110, a pair of linear actuators 204 are simultaneously extended in opposite directions until contacting the stringer webs 460 on opposite sides of the lower channel 454 to thereby stabilize the lower channel crawler 104 against movement relative to the lower channel 454. The stopper arms can be extended to stabilize the lower channel crawler 104 prior and during deployment of the operational device 320.

For the lower channel crawler 104, step 508 of deploying the operational device 320 comprises raising the operational device 320 up from the carriage upper side 118 and out of the lower channel 454 using the deployment mechanism 300. As shown in FIG. 22, step 508 of deploying the operational device 320 comprises raising the operational device 320 up from the carriage upper side 118 using a robotic arm 310 coupled to the lower channel 454 carrier at one end and which fits within the lower channel carriage 110 when folded in its stowed position 322. The free end of the robotic arm 310 supports a lower camera 332, which can be configured similar to the above-described upper camera 328. For example, the upper camera 328 and the lower camera 332 can each be configured as 360 degree cameras having the capability to capture images of the surroundings all at once in every direction.

As shown in FIG. 5 and mentioned above, the method 500 can include operating the upper channel crawler 102 and the lower channel crawler 104 in a complementary manner. For example, during inspection of a wing box 416, the method 500 can include using the crane mechanism 302 of the upper channel crawler 102 to lower the upper camera 328 within a rib bay 428 of the wing box 416. The method 500 additionally includes using the robotic arm 310 of the lower channel crawler 104 to raise the lower camera 332 into a position for inspecting components or regions of the wing box 416 that cannot be imaged by the upper camera 328.

The upper channel crawler 102 and/the lower channel crawler 104 can be operated via programming and/or via remote control. More specifically, step 504 of moving the carriage 106 through the channel 450, step 506 of extending the stabilizing mechanism 200, step 508 of deploying the operational device 320 using the deployment mechanism 300, and/or step 510 of performing the operation using the operational device 320 can be performed via preprogrammed instructions and/or via remote control. For example, each channel crawler 100 can be preprogrammed to move to one or more predetermined locations along the channel 450 (e.g., stringer channel 456) and operate the deployment mechanism 300 to deploy the cameras 326 out of the carriage 106 and into a predetermined three-dimensional position within a confined space for capturing images. As mentioned above, the preprogrammed instructions can provide the option for manually pausing the movement and/or operation of any one of the above-described components and mechanisms, and allow an operator (e.g., inspection mechanic) to temporarily control the operation of the upper channel crawler 102 and/the lower channel crawler 104.

In addition to their use for inspection purposes, the cameras 326 can be turned on at any time during operation of the channel crawlers 100 to provide environmental awareness to an operator who is monitoring and/or controlling the channel crawler 100. For example, the cameras 326 can be turned on at any time during movement of a channel crawler 100 along a channel 450, during deployment of the stabilizing mechanisms 200 from the carriage 106, and/or during operation of the deployment mechanisms 300 when moving a camera 326 to a desired three-dimensional camera placement position.

The method 500 can optionally include determining a minimum set of camera placement positions of the upper camera 328 and the lower camera 332 that provide full visual inspection coverage of a confined space. For example, for a wing tank 432 of an aircraft 400 wing 414, the method 500 can include determining the minimum set of camera placement position in each rib bay 428 that will provide full coverage of the entire wing tank 432 including all systems 406 in the wing tank 432. Determination of the minimum set of camera placement positions can be achieved by initially placing the upper camera 328 and the lower camera 332 at every location in the wing tank 432 and collecting scans from images captured by each camera 326. The method 500 further includes iteratively finding the camera placement positions where the scans cover the most unseen points or region in the wing tank 432. The method 500 can also include determining optimal trajectories of the upper and lower cameras 332 as a means for developing robot path planning for the movements of the upper and lower channel 454 crawlers 100 and their various components and mechanisms.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A channel crawler, comprising:
   a carriage having wheels configured to engage surfaces that define a channel through which the carriage is configured to move;
   a stabilizing mechanism configured to extend from the carriage and engage a non-horizontal surface of the channel in a manner restricting unintended movement of the carriage in one or more directions; and
   a deployment mechanism configured to fit within the carriage when retracted, and selectively deploy an operational device from a stowed position within the carriage to a deployed position outside the channel for performing an operation in relation to at least one of structure and hardware proximate the channel.

2. The channel crawler of claim 1, wherein:
   the carriage has a carriage upper side;
   the wheels include vertical wheels configured to engage a channel lower surface;
   the stabilizing mechanism comprises one or more selectively-extendible stopper arms configured to engage one or more non-horizontal surfaces of the channel and arrest movement of the carriage relative to the channel; and
   the deployment mechanism is configured to raise the operational device up from the carriage upper side.

3. The channel crawler of claim 2, wherein:
   the vertical wheels are omnidirectional wheels configured to allow lateral movement of the carriage for accommodating directional changes in the channel.

4. The channel crawler of claim 1, wherein:
   the carriage has a carriage lower side;
   the wheels include vertical wheels and horizontal wheels configured to respectively engage a channel lower surface and a channel first side surface of the channel;

the stabilizing mechanism comprises a diagonally-mounted element configured to engage a channel second side surface in a manner urging the horizontal wheels against the channel first side surface for restricting vertical movement of the carriage relative to the channel; and the deployment mechanism is configured to lower the operational device down from the carriage lower side.

5. The channel crawler of claim 4, wherein the diagonally-mounted element comprises one of the following:
an outwardly-biased diagonal wheel configured to roll along the channel second side surface; or
an outwardly-biased diagonal slider arm configured to slide along the channel second side surface.

6. The channel crawler of claim 1, wherein:
one of the wheels is a drive wheel configured to propel the channel crawler through the channel.

7. The channel crawler of claim 6, wherein:
at least one of the drive wheel, the stabilizing mechanism, the deployment mechanism, and the operational device is operated via at least one of preprogrammed instructions and remote control.

8. The channel crawler of claim 1, wherein:
the operational device comprises a camera configured to capture images of the at least one of a structure and hardware proximate the channel.

9. The channel crawler of claim 1, wherein the deployment mechanism comprises one of the following:
a crane mechanism having a cable configured to lower the operational device from the carriage;
a robotic arm configured to raise the operational device from the carriage.

10. An inspection system, comprising:
an upper channel crawler, comprising:
an upper channel carriage having a carriage lower side and wheels configured to engage opposing side surfaces of an upper channel through which the upper channel carriage is configured to move;
a crane mechanism configured to lower an upper camera from the carriage lower side into a space between the upper channel and a lower channel;
a lower channel crawler, comprising:
a lower channel carriage having a carriage upper side and wheels configured to engage a lower surface of the lower channel through which the lower channel carriage is configured to move; and
a robotic arm configured to raise a lower camera from the carriage upper side for inspecting portions of the space that are outside a field of view of the upper camera.

11. A method, comprising:
moving a carriage through a channel via wheels engaging surfaces that define the channel;
extending a stabilizing mechanism from the carriage and into engagement with a non-horizontal surface of the channel in a manner restricting unintended movement of the carriage in one or more directions;
deploying an operational device from a stowed position within the carriage to a deployed position outside the channel using a deployment mechanism configured to fit within the carriage when retracted; and
performing an operation in relation to at least one of structure and hardware proximate the channel using the operational device in the deployed position.

12. The method of claim 11, wherein moving the carriage through the channel, extending the stabilizing mechanism, and deploying the operational device from the stowed position respectively comprise:
engaging vertical wheels of the carriage to a channel lower surface of the channel;
extending one or more stopper arms into engagement with one or more non-horizontal surfaces of the channel in a manner arresting movement of the carriage relative to the channel; and
raising the operational device up from a carriage upper side and out of the channel using the deployment mechanism.

13. The method of claim 12, wherein moving the carriage through the channel further comprises:
moving the carriage in a lateral direction using the vertical wheels configured as omnidirectional wheels for accommodating directional changes in the channel.

14. The method of claim 11, wherein moving the carriage through the channel, extending the stabilizing mechanism, and deploying the operational device from the stowed position respectively comprise:
engaging vertical wheels and horizontal wheels to surfaces on a first side of the channel;
engaging a diagonally-mounted element to a surface on a second side of the channel in a manner urging the horizontal wheels against the first side and restricting vertical movement of the carriage relative to the channel; and
lowering the operational device down from a carriage lower side and out of the channel using the deployment mechanism.

15. The method of claim 14, wherein engaging the diagonally-mounted element to the surface on the second side of the channel comprises one of the following:
biasing a wheel into rolling engagement with the surface; or
biasing a slider arm into sliding engagement with the surface.

16. The method of claim 11, wherein moving the carriage through the channel comprises:
propelling the carriage through the channel using one of the wheels configured as a drive wheel.

17. The method of claim 11, wherein at least one of moving the carriage through the channel, extending the stabilizing mechanism, deploying the operational device, and performing the operation is performed via at least one of preprogrammed instructions and remote control.

18. The method of claim 11, wherein performing the operation using the operational device comprises:
capturing images of the at least one of structure and hardware using a camera.

19. The method of claim 11, wherein deploying the operational device from the stowed position comprises one of:
raising the operational device up from a carriage upper side and out of the channel using a robotic arm;
lowering the operational device down from a carriage lower side and out of the channel using a crane mechanism.

20. The method of claim 11, wherein moving the carriage through the channel comprises:
moving the carriage through a stringer channel of an aircraft structure, and the stringer channel is defined by a pair of stringers and a skin section extending between the pair of stringers.

* * * * *